United States Patent [19]

Kikuchi et al.

[11] Patent Number: 5,144,450
[45] Date of Patent: Sep. 1, 1992

[54] AUTO FOCUS FREQUENCY CONVERSION FILTER FOR CCD IMAGERS HAVING DIFFERENT NUMBERS OF PIXELS

[75] Inventors: Akihiro Kikuchi, Chiba; Toshiharu Kondo, Kanagawa; Takashi Kohashi; Fumiaki Kato, both of Chiba; Katsuaki Hirota, Kanagawa, all of Japan

[73] Assignee: Sony corporation, Tokyo, Japan

[21] Appl. No.: 660,016

[22] Filed: Feb. 25, 1991

[30] Foreign Application Priority Data

Feb. 27, 1990 [JP] Japan .................................. 2-47010

[51] Int. Cl.$^5$ .......................................... H09N 5/232
[52] U.S. Cl. ...................................... 358/227; 358/43; 328/15
[58] Field of Search ............... 358/138, 227, 160, 209, 358/98, 43, 41, 55; 328/15-17; 354/400, 404, 402

[56] References Cited

U.S. PATENT DOCUMENTS

| | | | |
|---|---|---|---|
| 3,660,767 | 5/1972 | Yoshino et al. | 328/15 |
| 4,355,228 | 10/1982 | Sama et al. | 328/17 |
| 4,672,456 | 6/1987 | Murai et al. | 358/227 |
| 4,740,076 | 4/1988 | Ueda et al. | 358/227 X |
| 4,845,437 | 7/1989 | Mansur et al. | 328/15 |
| 4,943,850 | 7/1990 | Asaida . | |
| 4,985,777 | 1/1991 | Kawada | 358/227 |

FOREIGN PATENT DOCUMENTS 111362 5/1984 European Pat. Off. .
262647 4/1988 European Pat. Off. .
336669 10/1989 European Pat. Off. .

*Primary Examiner*—Victor R. Kostak
*Attorney, Agent, or Firm*—Lewis H. Eslinger; Jay H. Maioli

[57] ABSTRACT

A sampling frequency conversion filter circuit permits the same auto focus circuit to be used with CCD imagers having different numbers of pixels per line. The conversion filter converts a digital signal of a first sampling frequency into a second sampling frequency and for providing a digital signal of the first sampling frequency with a predetermined frequency characteristic includes a delay circuit for delaying an input digital signal of the first sampling frequency by a predetermined amount; a first flip-flop for taking in the input digital signal of the first sampling frequency in synchronism with a clock of the second sampling frequency; a second flip-flop for taking in the digital signal of the first sampling frequency delayed by the predetermined amount through the delay circuit with a clock of the second sampling frequency; an adder for adding outputs of the first and flip-flops; and control circuits for controlling inputs of the first and second flip-flops to obtain from the adder circuit an output equivalent to a result obtained by over-sampling the digital signal of the first sampling frequency at a frequency that is a common multiple of the first sampling frequency and the second sampling frequency, and then re-sampling it at the second sampling frequency via a filter having the predetermined frequency characteristic.

12 Claims, 15 Drawing Sheets

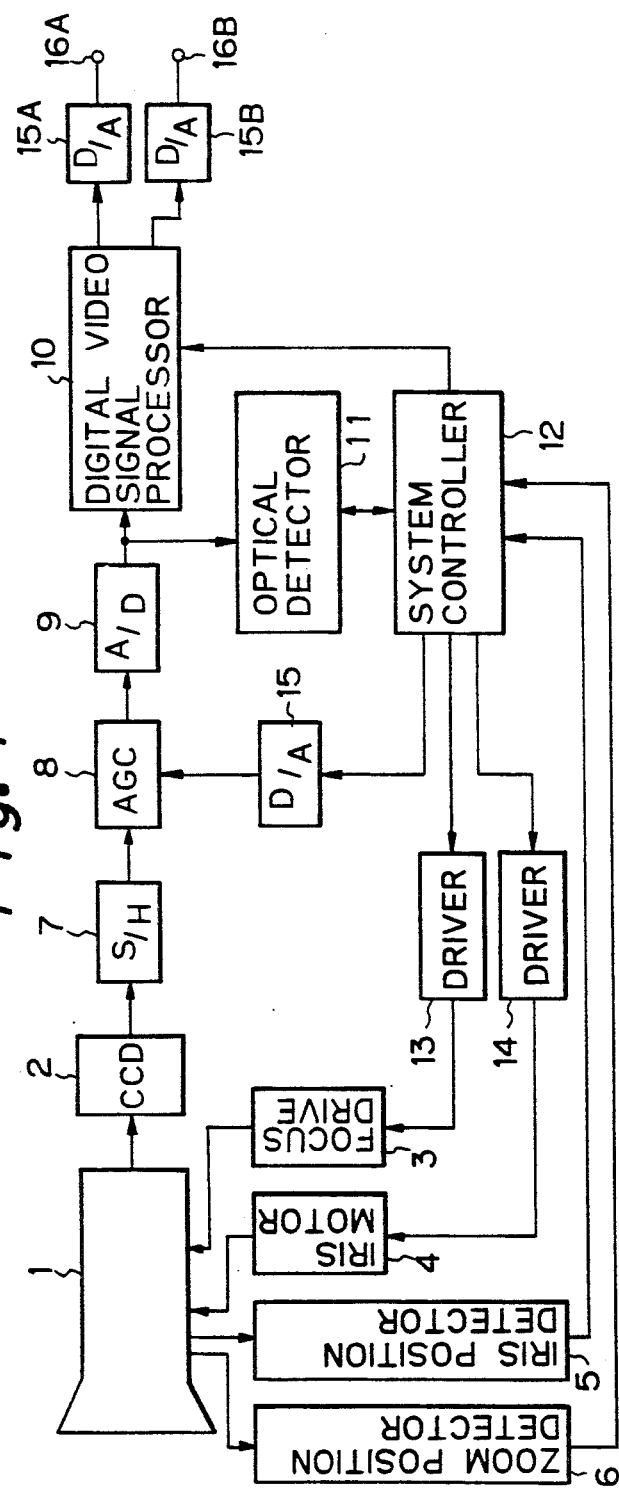
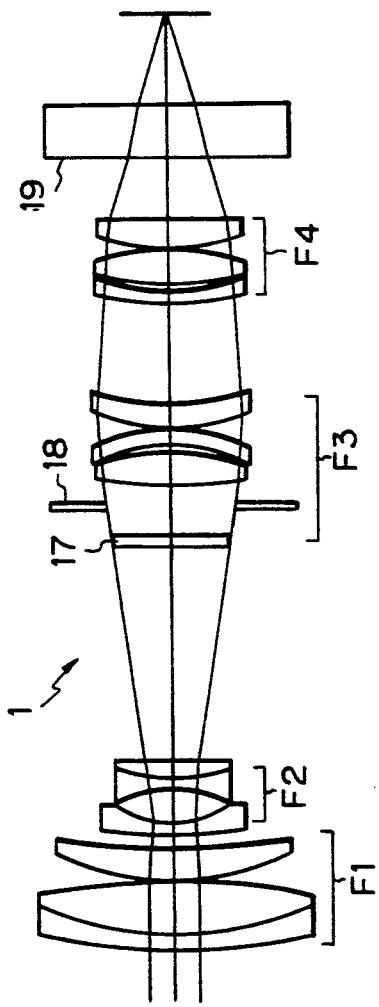
Fig. 1
Fig. 2

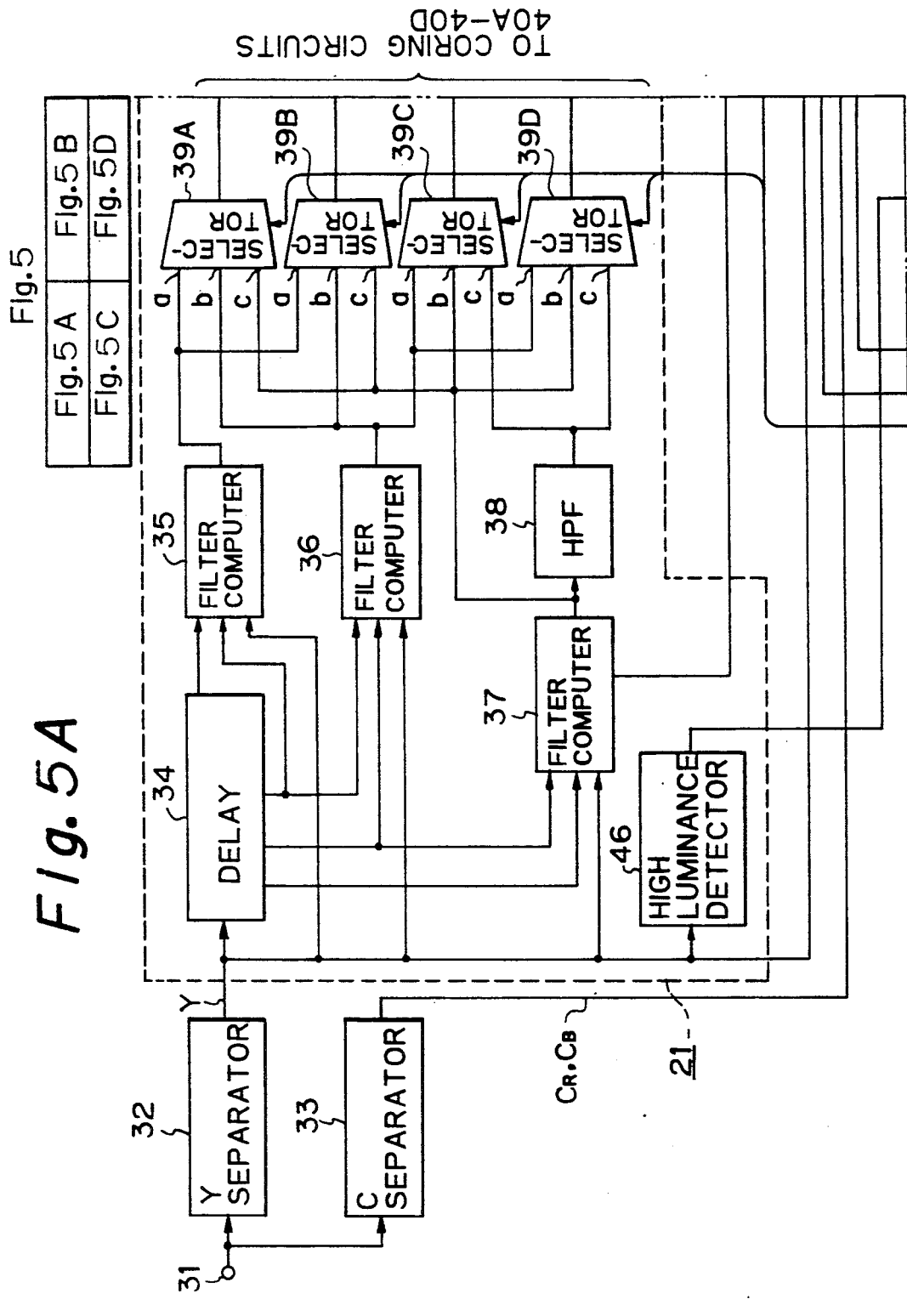

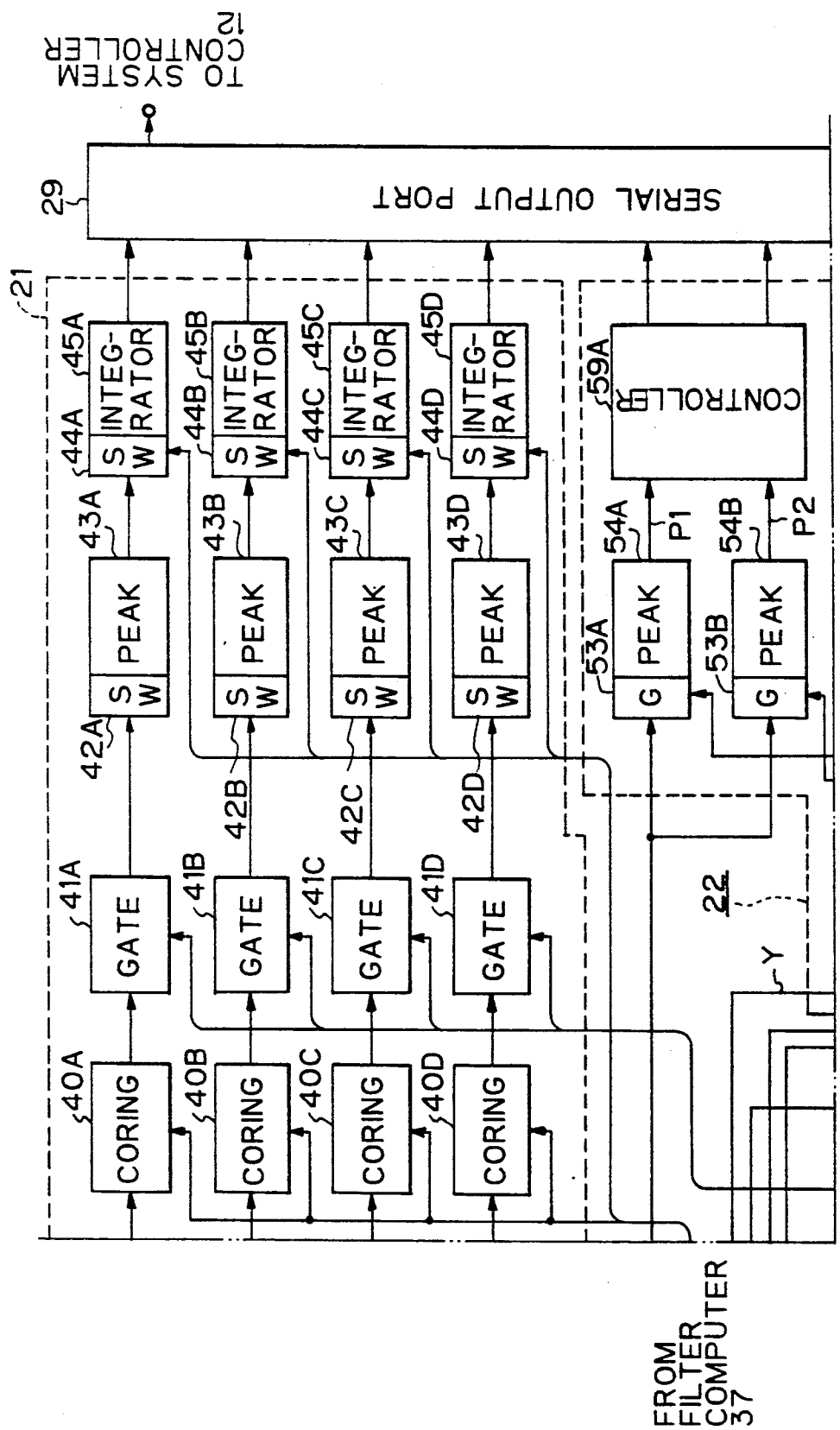

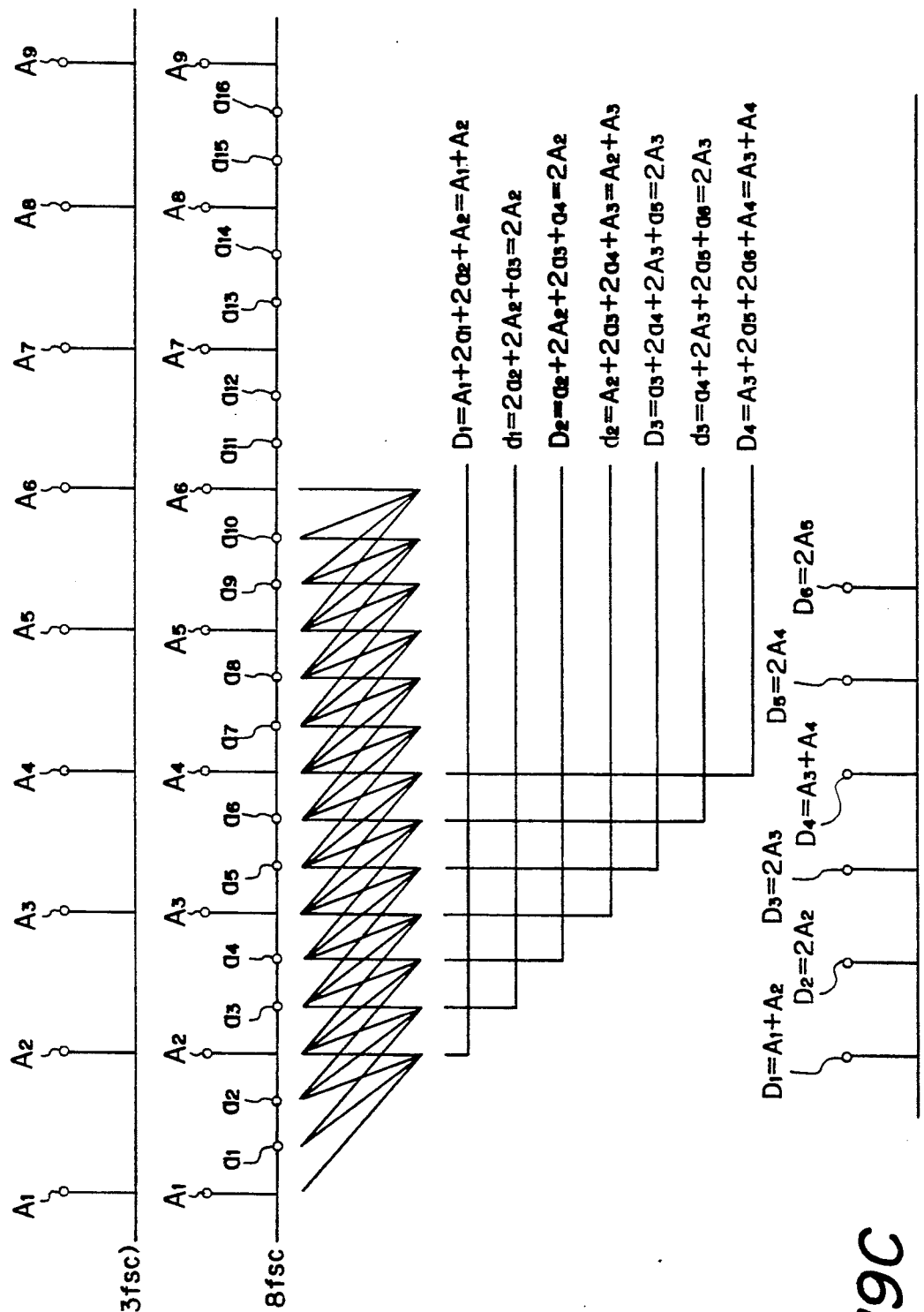

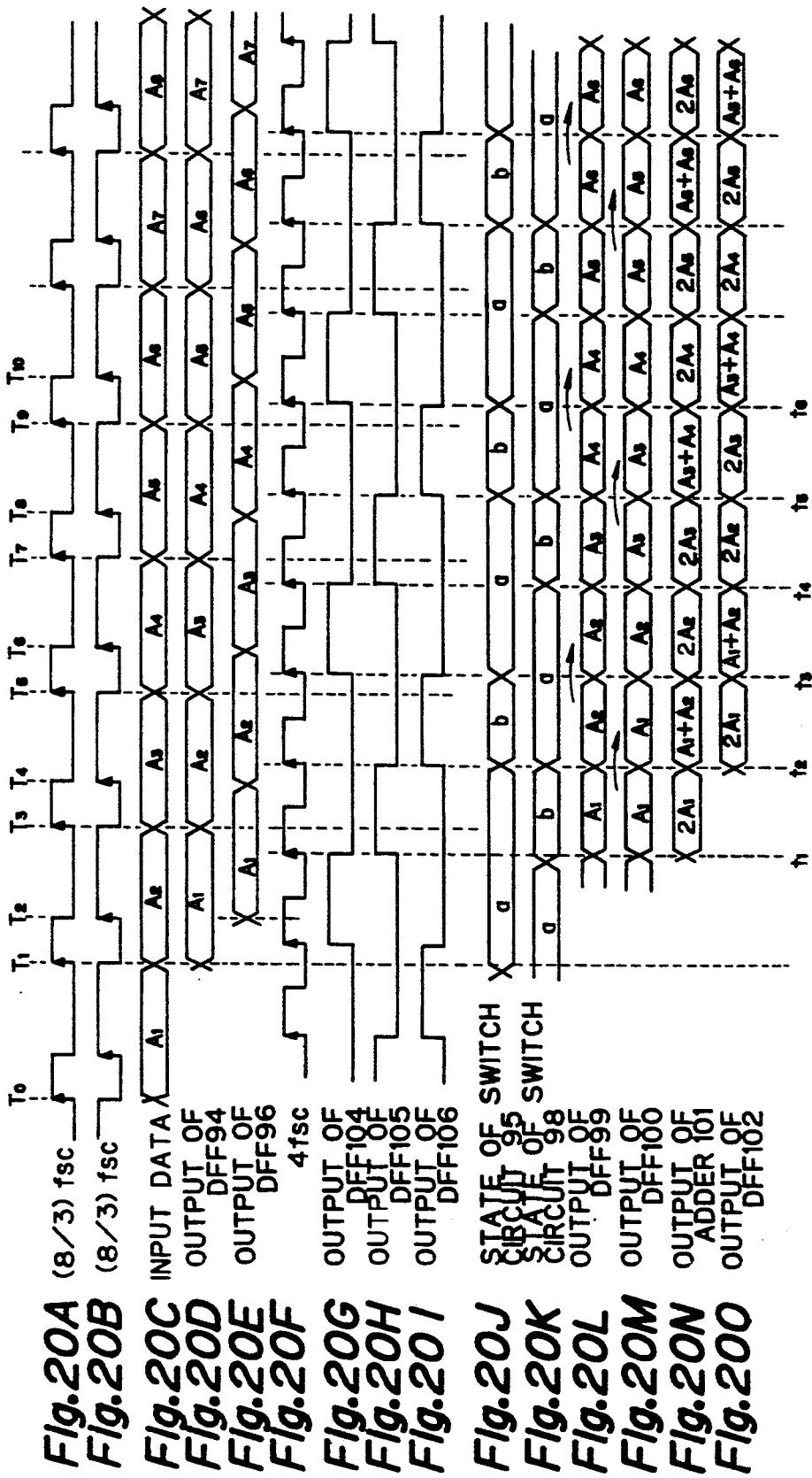

Fig.21A 4 fsc
Fig.21B INPUT DATA
Fig.21C OUTPUT OF DFF94
Fig.21D OUTPUT OF DFF96
Fig.21E STATE OF SWITCH CIRCUIT 95
Fig.21F STATE OF SWITCH CIRCUIT 98
Fig.21G OUTPUT OF DFF99
Fig.21H OUTPUT OF DFF100
Fig.21I OUTPUT OF ADDER 101
Fig.21J OUTPUT OF DFF102

AUTO FOCUS FREQUENCY CONVERSION FILTER FOR CCD IMAGERS HAVING DIFFERENT NUMBERS OF PIXELS

BACKGROUND OF THE INVENTION

1. Field of the Invention

The present invention relates to a sampling frequency conversion filter and, more particularly, to a sampling frequency conversion filter for permitting a digital signal obtained from a CCD imaging device having, for example, 760 pixels a line and a digital signal obtained form a CCD imaging device having, for example, 510 pixels a line to be processed as digital signals of the same sampling frequency.

2. Description of the Background

There is a known auto-focus circuit that operates on the principle that the intermediate and high range levels in a luminance signal from a CCD imaging device are a maximum at the focus position. The intermediate and high range components in the luminance signal from the CCD imaging device are extracted by a high-pass filter and evaluated by integrating the level of the intermediate and high-range components within a predetermined focus area. The correct focus position is obtained by controlling the position of the lens to maximize the evaluated value. In a conventional auto-focus circuit of this kind, an analog, high-pass filter is used to extract intermediate and high-range components in a luminance signal from a CCD imaging device. This analog circuit, however, does not have good temperature characteristics, and is difficult to miniaturize. In this connection, there has been proposed a system for digitizing a video signal from the CCD imaging device and performing auto-focus control in a digital circuit.

In constructing the auto-focus circuit from a digital circuit, a digital high-pass filter is used to extract intermediate and high-range components in the luminance signal produced by from the CCD imaging device. The characteristics of the digital, high-pass filter vary with the sampling frequency of the digital signal. The CCD imaging devices typically employed are of two formats, for example, 760 pixels per line or 510 pixels per line. In the case of a CCD imaging device having 510 pixels per line, the sampling frequency is (8/3) of the color subcarrier frequency (fsc). In the case of the CCD imaging device having 760 pixels per line, the sampling frequency is 4 fsc.

Therefore, in order to construct an auto-focus circuit using digital, high-pass filters suitable for both the CCD imaging device having 510 pixels per line and the CCD imaging device having 760 pixels per line, it is necessary to convert the first sampling frequency of (8/3) fsc, or the second sampling frequency of 4 fsc into a common sampling frequency.

One approach would be to convert the digital signal of sampling frequency (8/3) fsc or 4 fsc from the CCD imaging device into a common frequency of 2 fsc. Nevertheless, if the digital signal of sampling frequency (8/3) fsc or 4 fsc is converted into the sampling frequency 2 fsc, a problem caused by aliasing will occur. Thus, if separate filters are provided for the digital signal of sampling frequency (8/3) fsc and for the digital signal of sampling frequency 4 fsc in order to remove the adverse effects of aliasing, the circuit will be large in scale and not subject to the miniaturization that is required of a video camera.

OBJECTS AND SUMMARY OF THE INVENTION

Accordingly, it is an object of the present invention to provide a frequency conversion filter for use with CCD imaging devices having different numbers of pixels per line that can eliminate the above-noted defects inherent in previously proposed conversion filters.

It is also an object of the present invention to provide a sampling frequency conversion filter capable of converting digital signals from CCD imaging devices having different numbers of pixels into the same sampling frequency and alleviating adverse effects caused by aliasing without increasing the scale of the circuit.

According to an aspect of the invention, a sampling frequency conversion filter circuit converts a digital signal of a first sampling frequency into a second sampling frequency and imparts to a digital signal of the first sampling frequency a predetermined frequency characteristic. The conversion filter circuit includes a delay circuit for delaying an input digital signal of the first sampling frequency by a predetermined amount, a first flip-flop circuit for taking in the input digital signal of the first sampling frequency in synchronism with a clock signal of the second sampling frequency, a second flip-flop circuit for taking in the digital signal of the first sampling frequency delayed by the predetermined amount through the delay circuit with a clock of the second sampling frequency, an adder circuit for adding an output of the first flip-flop and an output of the second flip-flop, and control circuits for controlling inputs of the first and second flip-flops to obtain from the adder circuit an output equivalent to a result obtained by over-sampling the digital signal of the first sampling frequency at a frequency that is a common multiple of the first sampling frequency and the second sampling frequency, and then resampling it at the second sampling frequency via a filter having the predetermined frequency characteristic.

More specifically, when the digital signal of sampling frequency (8/3) fsc is over-sampled at a sampling frequency 8 fsc, which is a common multiple of sampling frequency 4 fsc, and is output through a filter having a transfer function represented by:

$$H(Z)=(1+2Z^{-1}+2Z^{-2}+Z^{-3})/6$$

output data $D_1$, $d_1$, $D_2$, $d_2$, ... are expressed by:

$$D_1 = (A_1 + 2a_1 + 2a_2 + A_2)$$
$$d_1 = (a_1 + 2a_2 + 2A_2 + a_3)$$
$$D_2 = (a_2 + 2A_2 + 2a_3 + a_4)$$
$$d_2 = (A_2 + 2a_3 + 2a_4 + A_3)$$
$$D_3 = (a_3 + 2A_4 + 2A_3 + a_5)$$
$$d_3 = (a_4 + 2A_3 + 2a_5 + a_6)$$
$$D_4 = (A_3 + 2a_5 + 2a_6 + A_4)$$

Since data $a_1$, $a_2$, $a_3$, $a_4$, $a_5$, $a_6$, ... are 0, the following equations are valid:

$$D_1 = A_1 + A_2$$
$$d_1 = 2A_2$$
$$D_2 = 2A_2$$
$$d_2 = A_2 + A_3$$
$$D_3 = 2A_3$$
$$d_3 = 2A_3$$
$$D_4 = A_3 + A_4$$

When such digital signal is re-sampled at sampling frequency 4 fsc, the result is:
}

$D_1 = A_1 + A_2$
$D_2 = 2A_2$
$D_3 = 2A_3$
$D_4 = A_3 + A_4$
$D_5 = 2A_4$
$D_6 = 2A_5$

In the case of an input signal of sampling frequency (8/3) fsc, in order to limit the band width and covert the sampling frequency to 4 fsc, the data are output sequentially by the conversion filter.

The above and other objects, features, and advantages of the present invention will become apparent from the following detailed description of illustrative embodiments thereof to be read in conjunction with the following drawings, in which like numerals represent the same or similar elements.

BRIEF DESCRIPTION OF THE DRAWINGS

FIG. 1 is a schematic in block diagram form of a video camera to which the present invention is applicable;

FIG. 2 is an elevation view useful in explaining a lens arrangement used in the video camera of FIG. 1;

FIG. 3 is a schematic representation useful in explaining a pixel arrangement of an imaging device in the video camera of FIG. 1;

FIGS. 4A and 4B are representations useful in explaining the timing of the output of an optical detector in the video camera shown in FIG. 1;

FIGS. 5A-5D are schematics in block diagram form that when combined show the optical detector system in the video camera of FIG. 1;

FIGS. 19A-19C are representations useful in explaining operation of the conversion filter according to an embodiment of the present invention;

FIGS. 20A-20O are timing charts useful in explaining operation of the conversion filter for use with a CCD imaging device having 510 pixels per line;

FIGS. 21A-21J are timing charts useful in explaining operation of the conversion filter for use with a CCD imaging device having 760 pixels per line;

DETAILED DESCRIPTION OF THE PREFERRED EMBODIMENT

Figure 5C:
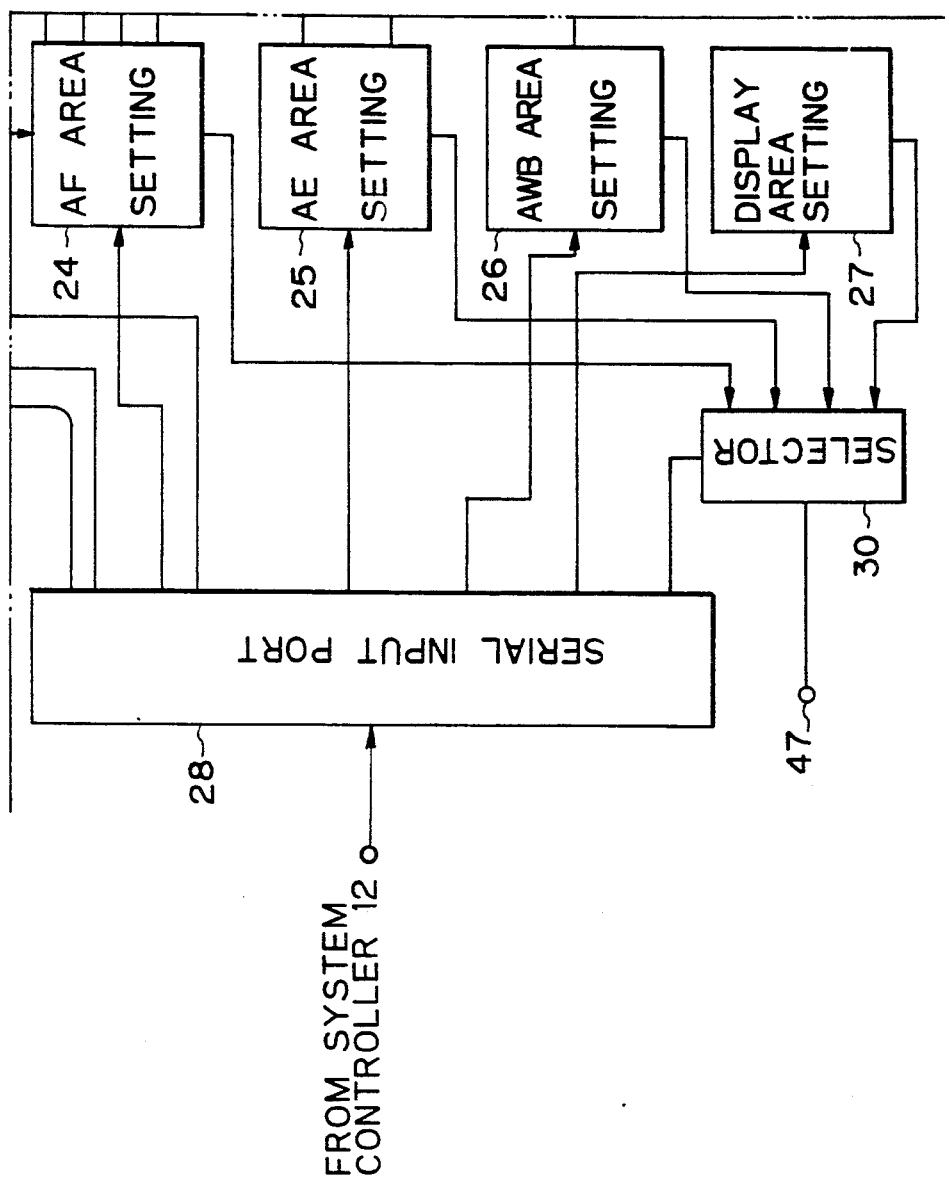

Referring now to FIG. 1, the entire arrangement of a video camera to which the present invention is applicable is represented. In FIG. 1, a composite lens 1 and a CCD 2 imaging device are shown in which an image of an object obtained via lens 1 is formed onto a receptor surface of CCD imaging device 2, and an imaging signal is obtained from CCD imaging device 2.

As shown in FIG. 2, composite lens 1 includes a fixed lens F1 formed of a first group of lenses, a zoom lens F2 formed of a second group of lenses, another fixed lens F3 formed of a third group of lenses, and a focus lens F4 formed of a fourth group of lenses. Between the zoom lens F2 and the fixed lens F3 are provided a phase noise (PN) filter 17 that provides optical noise filtering and an iris ring 18. Following the focus is a glass filter element 19 for cutting off infrared rays.

A focus position is obtained by moving the focus lens F4 by a focus drive motor 3. Focus drive motor 3 may be a step motor so that highly accurate control is carried out easily, and such step motor is driven with a sine wave from a driver 13 in order to reduce vibrations and noise. Opening and closing of the iris ring 18 within lens 1 is controlled by an iris drive motor 4 and the opening and closing state of iris ring 18 is detected by an iris position detector 5 composed of, for example, a Hall effect element. The position of the zoom lens F4 is detected by a zoom position detector 6, and the outputs of iris position detector 5 and zoom position detector 6 are supplied to a system controller 12.

Figures 3, 4A, 4B:
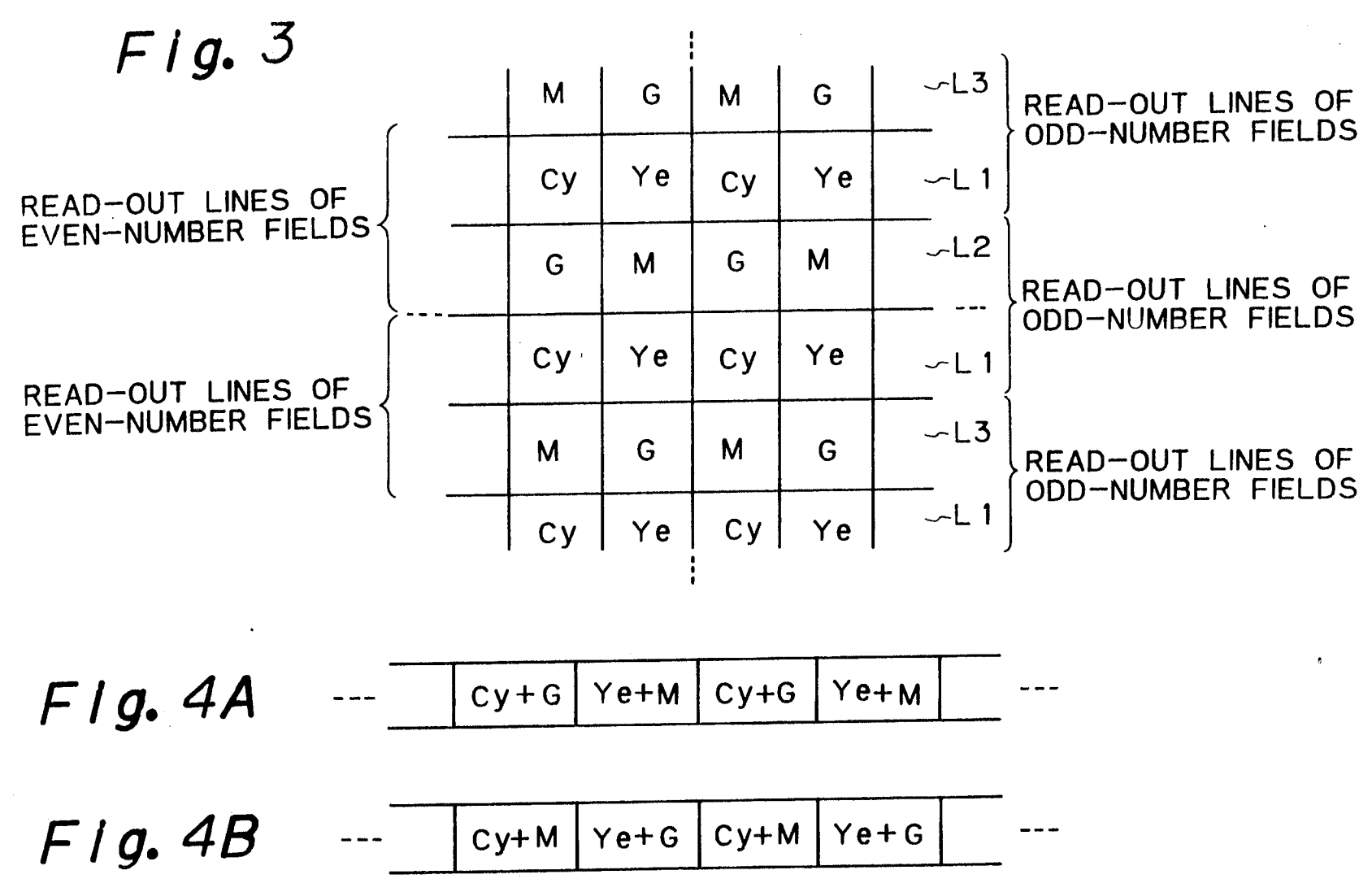

CCD imaging device 2 may have a pixel arrangement in the form of, for example a complementary-colored checkered pattern, as shown in FIG. 3, in which lines L1 having repetitious cyan (Cy) pixels and yellow (Ye) pixels are disposed every two lines. Lines L2 having repetitious green (G) pixels and magenta (M) pixels and lines L3 having repetitious magenta (M) pixels and green (G) pixels are alternately disposed between the lines L1 having repetitious (Cy) pixels and yellow (Ye) pixels.

Because of the different numbers of pixels of the CCD imaging devices, for example, 510 pixels per line or 760 pixels per line, when a CCD imaging device having 510 pixels per line is used, a transfer clock of frequency (8/3) fsc (approximately 9.55 MHz) is applied to the CCD imaging device. On the other hand, when a CCD imaging device having 760 pixels per line is used, a transfer clock of frequency 4 fsc (approximately 14.32 MHz) is applied to the CCD imaging device.

As shown in FIG. 1, the output of CCD imaging device 2 is supplied to a sample/hold circuit 7. In the case where a pixel arrangement having a complementary colored checkered pattern is employed for CCD imaging device 2, signals of CCD imaging device 2 output for every two pixels are sampled and held in the sample/hold circuit 7. An output of sample/hold circuit 7 is supplied to an A/D converter 9 via an automatic gain control (AGC) circuit 8. The output of the CCD imaging device 2 is digitized in, for example, 10 bits by A/D converter 9.

The output of A/D converter 9 is supplied to both a digital video signal processing circuit 10 and an optical detector 11. Optical detector 11 produces an auto-focus (AF) detection signal for auto-focus control, an auto-exposure (AE) detection signal for automatic exposure, and an auto-white-balance (AWB) detection signal for automatic white balance.

Optical detector 11 and system controller 12 are connected in a bi-directional relationship via a serial interface, not shown, through which optical detector 11 and system controller 12 give and take signals, for example, in every vertical period interval. System controller 12 supplies optical detector 11 with a focus detection area setting signal, an exposure detection area setting signal, a white balance detection area setting signal, and so on. Optical detector 11 supplies system controller 12 with an AF detection signal, an AE detection signal, an AWB detection signal, and so on.

Based on the AF detection signal supplied from optical detector 11 to system controller 12, system controller 12 outputs a lens drive signal. The lens drive signal is supplied to focus drive motor 3 via driver 13. As a result, the focus lens F4 is controlled to a correct focus position.

Based on the AE detection signal supplied from optical detector 11 to system controller 12, system controller 12 outputs both an iris control signal and an AGC control signal. The iris control signal is supplied to iris drive motor 4 via driver 14. The AGC control signal is supplied to AGC circuit 8 via a D/A converter 15. As a result, iris ring 18 is opened and closed in response to the level of the imaging signal from CCD imaging device 2 and, at the same time, the gain of AGC circuit 8 is determined.

The luminance signal and a chrominance signal are processed in digital video signal processing circuit 10, and the processed luminance signal and chrominance signal are converted into analog signals via D/A converters 15A and 15B, respectively, and are output at respective output terminals 16A and 16B.

FIGS. 5A–5D combine to show a circuit arrangement of optical detector 11 that produces detection signals for optical controls such as an AF detection signal for auto-focus control, an AE detection signal for automatic exposure, an AWB detection signal for auto white balance, and so on, as described above. Optical detector 11 includes an AF detector circuit 21, shown in FIGS. 5A and 5B, an AE detector circuit 22, shown in FIGS. 5B and 5D, and an AWB detector circuit 23, shown in FIG. 5D.

As shown in FIG. 5C, optical detector 11 includes an AF area setting circuit 24 for setting a focus detection area for carrying out auto-focus, an AE area setting circuit 25 for setting an exposure detection area for automatic exposure, and an AWB area setting circuit 26 for setting a white balance detection area for auto-white-balance control. Optical detector 11 further includes a display area setting circuit 27 for setting a display area.

AF area setting circuit 24, AE area setting circuit 25, and AWB area setting circuit 26 are supplied with a focus detection area setting signal, an exposure detection area setting signal, and a white-balance-detection area setting signal, respectively, from system controller 12 via a serial input port 28.

Based on the focus detection area setting signal, AF area setting circuit 24 determines, for example, two focus detection areas; based on the exposure detection area setting signal, AE area setting circuit 25 defines, for example, two exposure detection areas; and based on the white-balance-detection area setting signal, AWB area setting circuit 26 defines a white-balance-detection area. The positions and dimensions of these areas may be determined as desired.

Further, display area setting circuit 27 is supplied with a display area setting signal from system controller 12 via serial input port 28, so that the position and dimensions of the display area may be determined as desired.

Figure 7A:
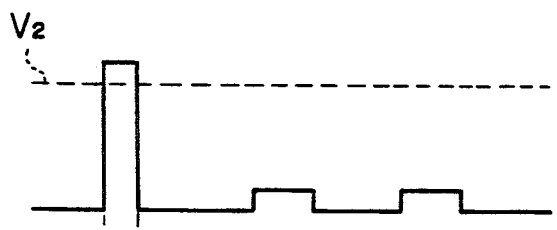
FIGS. 7A-7D are waveform diagrams useful in explaining high-level luminance compression.
Figure 7B:
Figure 7C:

Outputs of the AF area setting circuit 24, AE area setting circuit 25, AWB area setting circuit 26, and display area setting circuit 27 can selectively be output from an output terminal 47 via a selector 30, as shown in FIG. 7C. Selector 30 may also select a signal for defining a plurality of areas individually. The area based on the area setting signal selected by the selector 30 is displayed in a viewfinder (not shown), so that it is possible for the viewfinder to display either the same area as that being used for control or an area different from that being used for control. In addition, by using the display area, the position of a title, the position of an electronic zoom, and the like relative to the entire display area may be designated.

Figure 5D:
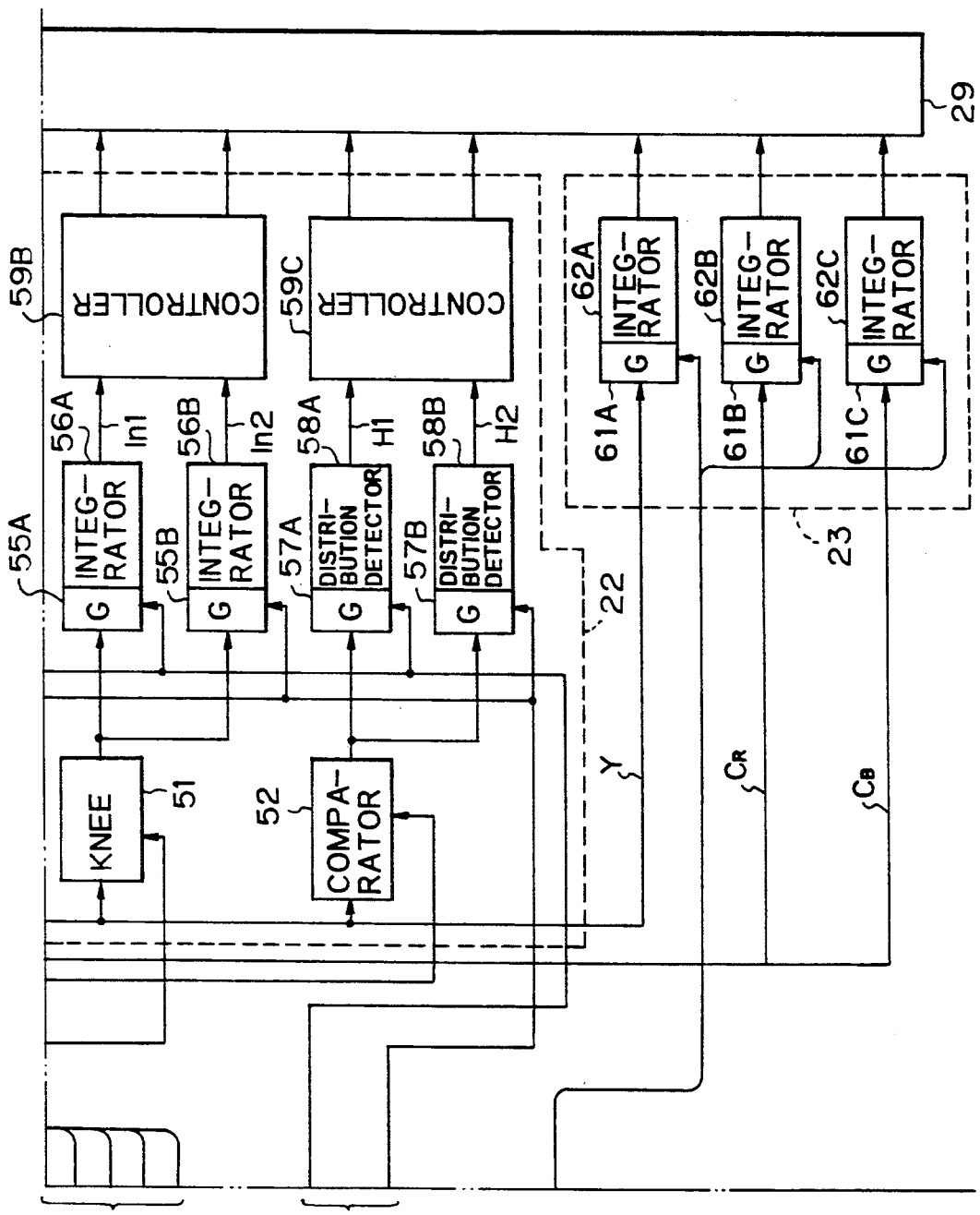

System controller 12 is supplied with the AF detection signal, AE detection signal, and AWB detection signal from optical detector 11 via a serial output portion 29, shown in FIGS. 5B and 5D.

In FIG. 5A, the digital imaging signal from A/D converter 9 in FIG. 3 is fed in at an input terminal 31 and supplied to both a luminance (Y) separator circuit 32 and a chrominance (C) separator circuit 33. Y separator circuit 32 produces a digital luminance signal Y from the digital imaging signal, and C separator circuit 33 produces chrominance signals $C_R$ and $C_B$ from the digital imaging signal.

As described above, CCD imaging device 2 may have a pixel arrangement in the form of a complementary colored checkered pattern, as shown in FIG. 3, and sample/hold circuit 7 samples and holds the signal that is output for every two pixels. Thus, an output corresponding to two pixels added in the vertical direction is output from sample/hold circuit 7.

In the case of the pixel arrangement shown in FIG. 3, when the added output corresponding to two pixels in the vertical direction is output, the lines shown in FIGS. 4A and 4B are repeated every two lines. The line shown in FIG. 4A is composed of a repetition of a sum signal (Cy+G) of cyan (Cy) and green (G) and a sum signal (Ye+M) of yellow (Ye) and magenta (M), and the line shown in FIG. 4B is composed of a repetition of a sum signal (Cy+M) of cyan (Cy) and magenta (M) and a sum signal (Ye+G) of yellow (Ye) and green (G).

In FIG. 5A, signals that differ by one sample are subtracted in C separator circuit 33. As a result, chrominance signals $C_R$ and $C_B$ are formed. More specifically, in the line such as shown in FIG. 4A in which the sum signal (Cy+G) of cyan and green and the sum signal (Ye+M) of yellow and magenta are alternately output, by subtracting signals that differ by one sample, the chrominance signal $C_R$ is obtained in the following manner.

$$\begin{aligned}\text{Since } Ye &= R + G, M = R + B, \text{ and}\\ Cy &= B + G(Ye + M) - (Cy + G)\\ &= ((R + G) + (R + B)) - ((B + G) + G)\\ &= 2R - G\\ &= C_R\end{aligned}$$

In the line, such as shown in FIG. 4B, in which the sum signal (Cy+M) of cyan and magenta and the sum signal (Ye+G) of yellow and green are alternately output, by subtracting signals the differ by one sample, the chrominance signal $C_B$ is obtained in the following manner.

$$\begin{aligned}(Ye + G) - (Cy + M) &= ((R + G) + G) -\\ &\quad ((B + G) + (R + B))\\ &= -2B + G\\ &= -C_B\end{aligned}$$

Signals that are different from one another by one sample are added in the Y separator circuit 32. As a result, the luminance signal Y is formed.

More specifically, in the line, such as shown in FIG. 4A, in which the sum signal (Cy+G) of cyan and green and the sum signal (Ye+M) of yellow magenta are alternately output, by adding signals that differ by one sample, the luminance signal Y is obtained in the following manner.

$$\begin{aligned}(Ye + M) + (Cy + G) &= ((R + G) + (R + B)) +\\ &\quad ((B + G) + G)\\ &= 3G + 2R + 2B\\ &= Y\end{aligned}$$

In the line, such as shown in FIG. 4B, in which the sum signal (Cy+M) of cyan and magenta and the sum signal (Ye+G) of yellow and green are alternately output, by adding signals that differ by one sample, the luminance signal Y is obtained in the following manner.

$$\begin{aligned}(Ye + G) + (Cy + M) &= ((R + G) + G) +\\ &\quad ((B + G) + (R + B))\\ &= 3G + 2B + 2R\\ &= Y\end{aligned}$$

Further, Y separator circuit 32 and C separator circuit 33 perform conversion of the sampling frequency. More specifically, input terminal 31 is supplied with a digital signal of sampling frequency (8/3) fsc in the case of using a CCD imaging device 2 having 510 pixels per line or with a digital signal of sampling frequency 4 fsc in the case of using a CCD imaging device 2 having 760 pixels per line. The sampling frequency (8/3) fsc or 4 fsc is converted into sampling frequency 2 fsc in the Y separator circuit 32 and the C separator circuit 33.

The output of Y separator circuit 32 is supplied to the AF detector circuit 21, AE detector circuit 22, and AWB detector circuit 23. The output of C separator circuit 33 is supplied to AWB detector circuit 23.

At a focus position, the levels of the intermediate and high-range components in the luminance signal from the CCD imaging device are maximized. Therefore, by regarding as an evaluated value the integrated level of the intermediate and high-range components in the luminance signal from CCD imaging device 2, within a predetermined use area and by controlling the position of the focus lens F4 to maximize the evaluated value, the focus position is obtained.

As shown in FIG. 5A in AF detector circuit 21 three kinds of high-pass filters each having different characteristics are composed of a delay circuit 34 and three filter computers 35, 36, and 37. More specifically, a high-pass filter can be composed of the delay circuit 34, filter computer 37, and a further high-pass filter 38 connected in cascade. As a result, four kinds of high-pass filters having different characteristics are available. The intermediate and high-range components in the luminance signal are extracted by these high-pass filters.

When the characteristics of the high-pass filters vary, the characteristics indicative of the relationship between the lens position and the evaluated focus value also vary. In the case where the characteristic is moderate, the range over which the focus position can be controlled is expanded, however, a precise focus position is difficult to obtain. In contrast, in the case where the characteristic is sharp, a precise focus position can be obtained, however, the range over which the focus position can be controlled is narrowed.

Therefore, in order for the focus lens F4 to be precisely controlled into the focus position over a wide range, it is effective to switch among a plurality of high-pass filters having different characteristics. More specifically, by moving the lens to the proximity of the focus position using a high-pass filter whose characteristic indicative of the relationship between the lens position and the evaluated value is moderate and, after the lens is moved to the proximity to the focus position, by switching to a high-pass filter whose characteristic indicative of the relationship between the lens position and the evaluated value is moderate and, after the lens is moved to the proximity to the focus position, by switching to a high-pass filter whose characteristic indicative of the relationship between the lens position and the evaluated value is sharp, control is performed to accurately and quickly drive the lens into the correct focus position.

According to one embodiment of the present invention, an output of one of these four kinds of high-pass filters having different characteristics can selectively be output by using selectors 39A to 39D.

More specifically, an output of the filter computing portion 35 is supplied to input terminals a of selector 29A and selector 39B. An output of the filter computing portion 36 is supplied to both input terminals b of selectors 39A and 39B and input terminals a of selectors 39C and 39D. An output of the filter computing portion 37 is supplied both to input terminals c of selectors 39A and 39B and to input terminals b of selectors 39C and 39D. An output of high-pass filter 38 is supplied to input terminals c of selectors 39C and 39D. By selectively switching selectors 39A to 39D, a filter output having a desired characteristic can be selected. Selectors 39A to 39D are switched on the basis of a filter select signal supplied from system controller 12 via serial input port 28.

Outputs of selectors 39A to 39D are supplied to coring circuits 40A to 40D, respectively. Coring circuits 40A to 40D are also supplied with coring level setting signals from system controller 12 via serial input port 28. Coring circuits 40A to 40D detect intermediate and high-range components of the digital luminance signal and remove a noise component therefrom.

More specifically, since there is almost no high-range components present in the luminance signal from the CCD imaging device 2 in the case of a picture having a simple image, the adverse effect of noise on the signal is increased. Coring circuits 40A to 40D are provided to prevent such adverse effects caused by noise.

Figure 6A:
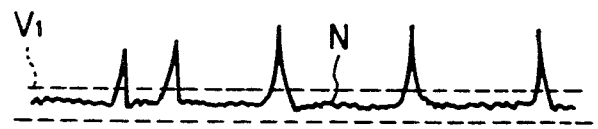
FIGS. 6A-6B are waveform diagrams useful in explaining the operation of signal coring.
Figure 6B:

In other words, if a noise component N is present in the output signal of the digital high-pass filter, as shown in FIG. 6A, this noise component will cause an error in the focus detection signal. Coring circuits 40A to 40D remove noise component N below a predetermined coring level $v_1$, as shown in FIG. 6B. The coring circuits 40A to 40D may be composed of subtractors, so that the coring level $v_1$ may be varied. For example, the coring level $v_1$ may be varied according to the picture and so on, in lieu of a constant coring level.

The outputs of coring circuits 40A to 40D are supplied to the gate circuits 41A to 41D, respectively, which are also supplied with a gate signal from AF area setting circuit 24 for setting the focus detection area. The gate signal controls the opening and closing of gate circuits 41A to 41D.

In the case that an object containing a high brightness portion, such as point light source, is photographed, an error possibly occurs in the evaluated value caused by the signal representing this high brightness portion. To prevent such errors, a high-brightness detector circuit 46 is provided that detects whether the imaging signal from CCD imaging device 2 is above a predetermined level. An output of high-brightness detector circuit 46 is supplied to AF area setting circuit 24, and if the imaging signal from the CCD imaging device 2 is above the predetermined level a corresponding focus detection area is masked.

Figure 7D:
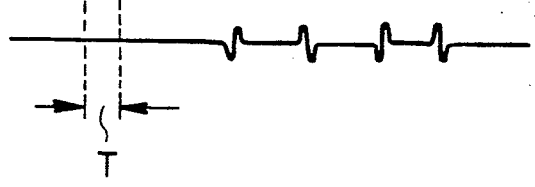
Figure 8A:
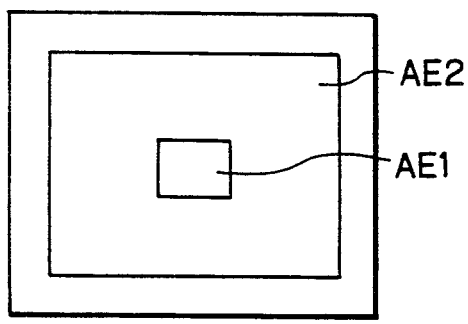
FIGS. 8A-8B are schematic representations useful in explaining exposure detection areas.
Figure 8B:
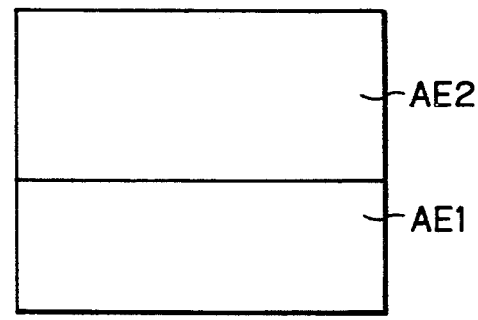
Figure 9:
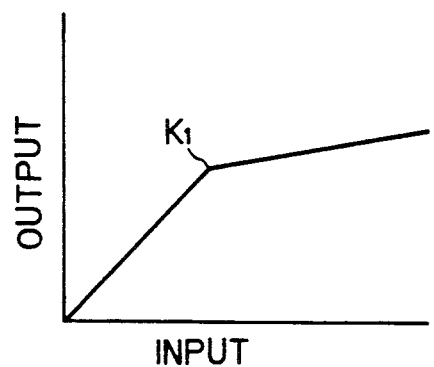
FIG. 9 is a graph for explaining characteristics of a knee circuit.

More specifically, as shown in FIG. 7A, if a high-level luminance signal above a predetermined value $v_2$ is output from CCD imaging device 2, a signal as shown in FIG. 7B will be output from the digital high-pass filter. In the time period T where the output of CCD imaging device 2 is above the predetermined value $v_2$, a masking signal is produced, as shown in FIG. 7C. During the time of the masking signal, gate circuits 41A to 41D are closed, and as a result, any adverse effects caused by the high brightness portion are removed, as shown in FIG. 7D.

Outputs of the gate circuits 41A to 41D shown in FIG. 5B are supplied to peak detector circuits 43A to 43D, respectively, via switch circuits 43A to 42D, respectively. Peak detector circuits 43A to 43D detect the peak values of the outputs of the gate circuits 41A to 41D, respectively. Outputs of peak detector circuits 43A to 43D are supplied to integrator circuits 45A to 45D, respectively, via switch circuits 44A to 44D, respectively. The integrator circuits 45A to 45D selectively integrate the outputs of gate circuits 41A to 41D or the outputs of peak detector circuits 43A to 43D, respectively.

By suitably controlling switch circuits 42A to 42D and 44A to 44D, not only is an integrated value obtained, which is the so-called evaluated value of the intermediate and high-range component in the luminance signal in one picture, but also, for example, a peak value of the intermediate and high-range components in the luminance signal in one line and an integrated value of the peak values of the intermediate and high-range component in one picture can be obtained. The integrated value of the peak value of the intermediate and high range components in the luminance signal in one line and the integrated value of the peak values of the intermediate and high-range component in one picture can be used for determining the timing for switching the high-pass filters. Their outputs are supplied as the AF detection signal to system controller 12 via serial output port 29.

In the focus control circuit, focus control is carried out by defining, for example, two focus detection areas. More specifically, every two out of four filter outputs from selectors 39A to 39D are set in the same focus detection area. One of the outputs from two of the selectors 39A to 39D that have been set in the same focus detection area is used for obtaining the integrated value, or evaluated value, of the intermediate and high-range component levels in the luminance signal in the focus detection area, and the other is used for detecting the timing for switching the characteristics of the high-pass filters. Based on the evaluated value from each focus detection area, the focus lens F4 is moved until it is in proximity to the focus position, at which point the selectors 39A to 39D are switched to change the filter characteristics. Then, the focus lens F4 is positionally controlled to maximize the evaluated value.

When a plurality of focus detection areas are set in this manner, any camera angle provides precise focusing to an object and focusing while following a moving object is also possible.

Automatic exposure (AE) control is carried output by opening and closing the iris ring 18 and by setting the gain of the AGC circuit 8 so that the level of the luminance signal from the CCD imaging device 2 may be a predetermined value.

More specifically, because the brightness level of the background becomes very high in a counterlight condition, if the AE control is carried out by detecting the luminance signal level in a fixed exposure detection area, the aperture of the iris ring 18 is decreased, which causes the gain of the AGC circuit 8 to be set at a smaller value, which in turn causes a problem that the object image appears dark.

Figure 10A:
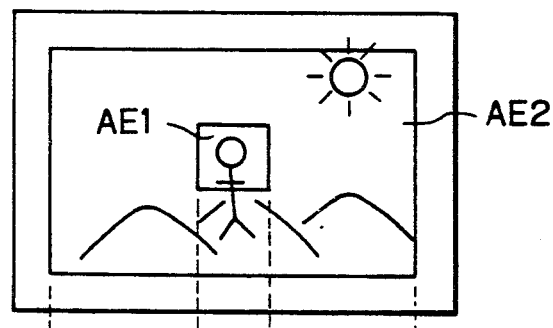
FIGS. 10A-10B are a pictorial representation and a waveform diagram, respectively, useful in explaining a distribution detector.
Figure 10B:
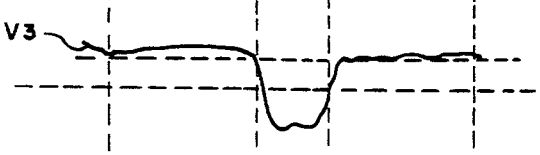

In order to ensure optimum AE control even under a counterlight condition or in an excessive forward-light condition, an embodiment of the invention is arranged to define an exposure detection area AE1 and an exposure detection area AE2, as shown in FIG. 10, to detect respective luminance signal levels. The positions and dimensions of the exposure detection areas AE1 and AE2 may be determined, as desired, by an exposure detection area setting signal from system controller 12. As shown in FIG. 10A, the exposure detection area AE1 may be provided in a central portion where an object is present, with the exposure detection area AE2 being provided at a peripheral portion that more likely comprises the background. Alternatively, as shown in FIG. 18B, the exposure detection area AE1 may be provided at a lower, foreground portion where an object is present, with the exposure detection area AE2 being provided at an upper portion.

In FIG. 5D, an output of Y separator circuit 32 is supplied to both a knee circuit 51 and a comparator 52. Comparator 52 is also supplied with a comparison level from the system controller via serial input port 28.

An output of the filter computing portion 37 of FIG. 5A is supplied to peak detector circuits 54A and 54B via gate circuits 53A and 53B, respectively. Filter computer 37 outputs a luminance signal from which a high-range noise component has been removed by a low-pass filter. More specifically, in the case of performing peak detection, a low-pass filter must be provided for removing a noise component. Because a digital high-pass filter based on a digital averaging low-pass filter is composed of delay circuit 34 and filter computer 37, both a high-pass filter output and a low-pass filter output can readily be extracted from filter computer 37. A luminance signal from which a high-range noise component is removed by the low-pass filter is supplied to peak detector circuits 54A and 54B via gate circuits 53A and 53B, respectively.

Gate circuits 53A and 53B are supplied with gate signals from AE detection area setting circuit 25 for defining the exposure detection areas AE1 and AE2. The gate signals control opening and closing of gate circuits 53A and 53B.

Figure 11:
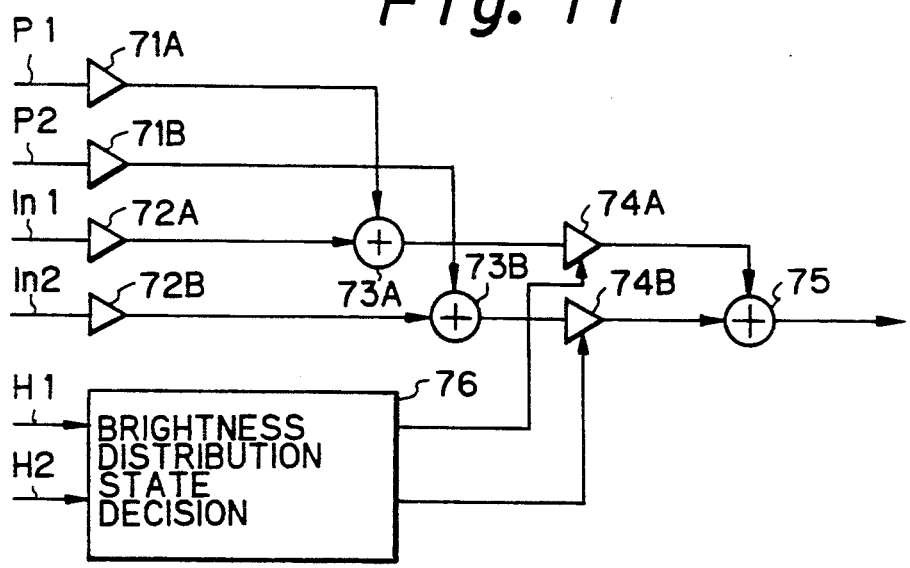
FIG. 11 is a schematic in a block diagram form useful in explaining automatic exposure control.

The knee circuit 51 makes the digital luminance signal have a nonlinear characteristic as shown in FIG. 11. If average detection is performed on the luminance signal level as it is, the averaged output will be increased by a high-brightness portion appearing in one part of the picture. This results in a dark appearance of the entire picture. Nevertheless, by using knee circuit 51, the gain of the high-brightness portion is decreased, and the problem described above is alleviated. Knee circuit 51 is supplied with a characteristic setting signal from system controller 12 via the serial input port 28, and this characteristic setting signal permits a turning point $k_1$ of the characteristic curve in knee circuit 51 to vary.

An output of knee circuit 51 is supplied to integrator circuits 56A and 56B via gate circuits 55A and 55B, respectively. Gate circuits 55A and 55B are also supplied with a gate signal from AE area setting circuit 25 for setting the exposure detection areas AE1 and AE2 that were explained relative to FIGS. 18A and 18B. The gate signal controls opening and closing of the gate circuits 55A and 55B.

Comparator 52 counts the number of samples of the luminance signal that are above a predetermined level and detects the distributed brightness condition. The output of comparator 52 is supplied to distribution detectors 58A and 58B via gate circuits 57A and 57B, respectively, which count the number of samples of the luminance signal that are above the predetermined brightness level. Gate circuits 57A and 57B are provided with a gate signal from AE area setting circuit 25 for defining the exposure detection areas AE1 and AE2. The gate signal controls opening and closing of gate circuits 57A and 57B.

The distribution state of the luminance signal level is detected by distribution detectors 58A and 58B. More specifically, when a picture to be photographed includes a counter-light condition, that is, a back-lighted scene, as shown in FIG. 10A, high luminance signal portions are distributed mostly along the periphery, whereas low luminance signal portions are distributed mostly in the central portion of the picture. This distribution state can be decided by the count value of the number of samples above a predetermined level $v_3$ in the exposure detection area AE1 and the count value of the number of samples above the predetermined level $v_3$ in the exposure detection area AE2.

On the other hand peak values P1 and P2 of the luminance signal in the exposure detection areas AE1 and AE2 are obtained by the peak detectors 54A and 54B and output to serial output port 29 via an output controller 59A.

Similarly, integrated values In1 and In2 of the luminance signal levels in the exposure detection areas AE1 and AE2 obtained by integrator circuits 56A and 56B are output to serial output port 29 via a second controller 59B.

Finally, count values H1 and H2 representing the number of samples above the predetermined level in the exposure area obtained by distribution detectors 58A and 58B are output to serial output port 29 via a third output controller 59C.

A detected average of the luminance signal is obtained at the outputs of integrator circuits 56A and 56B. Nevertheless, upon performing the AE control the average detection causes a low detection level, therefore, it requires a characteristic near the peak detection rather than the average detection. In this connection, an embodiment of the invention is arranged to detect a luminance signal level with a characteristic near the peak detection by appropriately mixing average and peak values. More specifically, as shown in the circuit diagram of FIG. 11, the peak values and P1 and P2 obtained by the peak detector circuits 54A and 54B, and the integrated values In1 and In2 obtained by the integrator circuits 56A and 56B are weighted by multipliers 71A, 71B, and 72A, 72B, respectively. Then, the weighted peak value P1 is added to the weighted integrated value In1 in adder 73A and the weighted peak value P2 is added to the weighted integrated value In2 in adder 73B. As a result, a detection characteristic near peak detection is obtained. By changing the coefficients of multipliers 71A and 71B and multipliers 72A and 72B, the detection level may be varied. These computations could also be carried out in a software implementation, whereby the detection level can be changed very easily.

According to the value obtained by appropriately weighing and adding the detection value of the luminance signal level in the exposure detection area AE1 and the detection value of the luminance signal level in the exposure detection area AE2, opening and closing of iris ring 18 and the gain of AGC circuit 8 are determined.

More specifically, the detection value of the luminance signal level in the exposure detection area AE1 and the detection value of the luminance signal level in the exposure detection area AE2 are obtained from the adders 73A and 73B, respectively. Outputs of the adders 73A and 73B are supplied to multipliers 74A and 74B, respectively. The outputs of multipliers 74A and 74B are supplied to an adder 75. The detection value of the luminance signal level in the peripheral exposure detection area AE1 and the detection value of the luminance signal level int he central exposure detection area AE2 are weighted by multipliers 74A, 74B and added by adder 75. The opening-closing state of iris ring 18 and the gain of AGC circuit 8 are determined according to the output of adder 75.

A forward-light condition, a counterlight condition, and an excessive forward-light condition are discriminated from the outputs of distribution detectors 58A and 58B, shown in FIG. 5B. More specifically, because a forward light condition results in a substantially uniform brightness throughout the entire picture, distribution of the luminance signal level is substantially even in the exposure detection area AE1 in the portion containing the object of interest and in the exposure detection area AE2 in the peripheral portion surrounding such object. In other words, the difference between the output H1 of distribution detector 58A and the output H2 of distribution detector 58B is not large.

In contrast thereto, counterlight conditions result in the background being extremely bright, so that the luminance signal levels above a predetermined value are distributed mostly in the peripheral exposure detection area AE2. Further, because excessive forward-light conditions result in the background being extremely dark, luminance signal levels below a predetermined value are distributed most in the exposure detection area AE1 wherein the object is located. Thus, the difference between the output H1 of distribution detector 58A and the output H2 of distribution detector 58B is large in counterlight and excessive forward-light conditions.

The outputs H1 and H2 of distribution detectors 58A and 58B, respectively, are supplied to a brightness distribution state decision circuit 76, shown in FIG. 11. Brightness distribution state decision circuit 76 detects whether it is in forward-light condition, counterlight condition or excessive forward-light condition. Responsive to an output of brightness distribution state decision circuit 76 and according to whatever counter light or excessive forward-light condition is present, the following control is carried out.

The weighting coefficients of multipliers 74A and 74B are determined in response to the outputs of brightness distribution state decision circuit 76. In counterlight and excessive forward-light conditions, the coefficient of multiplier 74A for weighting the brightness of the object portion is set to a large value, whereas the coefficient of multiplier 74B for weighing the brightness of the background portion is set to a small value. As a result, control approaches center-emphasized photometry, and optimum AE control is performed even under counterlight or excessive forward-light condition.

Positions and dimensions of the exposure detection areas AE1 and AE2 are determined according to the output of brightness distribution state decision circuit 76. More specifically, under forward-light conditions, as shown in FIG. 18B, the exposure detection area is divided into upper and lower portions, with the lower portion being the exposure detection area AE1 for the object and the upper portion being the exposure detection area AE2 for the background. In this manner, no variation occurs in the brightness even during panning. In counterlight and excessive forward-light conditions, as shown in FIG. 18A, the exposure detection area AE1 including the object is located at the center, whereas the exposure detection area AE2 for the background is relocated in the periphery. In addition to this rearrangement, it will be immediately noticed that the size of the exposure detection area AE1 including the object is decreased. In this manner, control becomes closer to center-emphasized photometry.

Figure 12A:
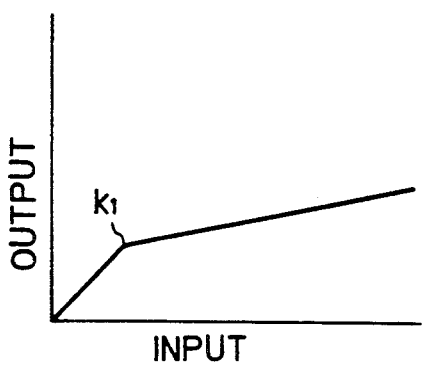
FIGS. 12A-12B are graphs useful in explaining control of the knee circuit.
Figure 12B:
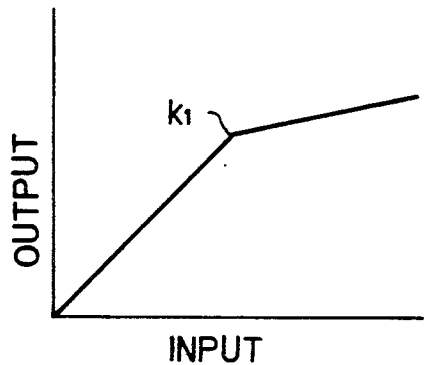
Figure 14A:
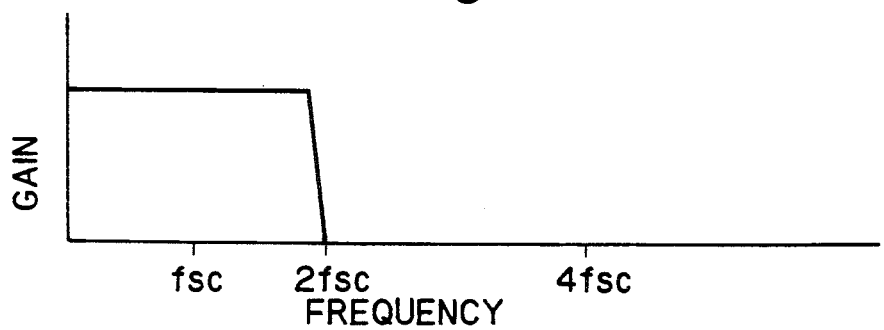
FIGS. 14A-14B are frequency spectrum diagrams useful in explaining the operation of a Y separator circuit.
Figure 14B:
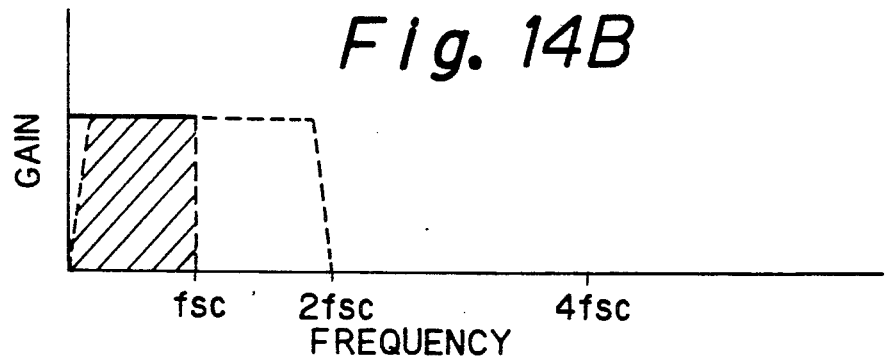

Further, the output of brightness distribution state decision circuit 76 may also be used to determine the turning point of knee circuit 51. More specifically, under counterlight conditions, the turning point $k_1$ of knee circuit 51 is shifted down, as shown in FIG. 14A. In this manner, because the gain in the high-brightness condition is decreased, the object never appears dark even under countlight condition. In the case of an excessive forward-light condition, the turning point $k_1$ of knee circuit 51 is raised, as shown in FIG. 12B. As a result, because the gain during a high-brightness condition is increased, the object never saturates even under excessive forward-light conditions.

Moreover, if the gain of the entire control system is set according to the output of brightness distribution state decision circuit 76, the object never appears dark even under counterlight conditions and never saturates even under excessive forward-light conditions.

It should be pointed out that all of the various controls responsive to the counterlight conditions and excessive forward-light conditions are not required in all systems. Problems with counterlight and excessive forward-light conditions can be nonetheless solved by combining selected ones of these controls.

Automatic white balance control (AWB) is carried out by controlling the levels of red (R), green (G), and blue (B) color signals based on a predetermined ratio. One embodiment of the present invention can perform both full-auto white-balance control, as well as one-push auto white-balance control. The full-auto white balance control performs white-balance control fully automatically, even when the integrated value of the entire picture will cross over to white.

Figure 13A:
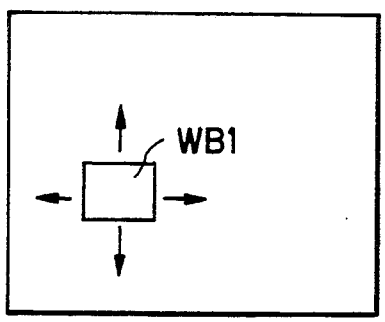
FIGS. 13A-13B are pictorial representations useful in explaining one-push auto white balance.
Figure 13B:
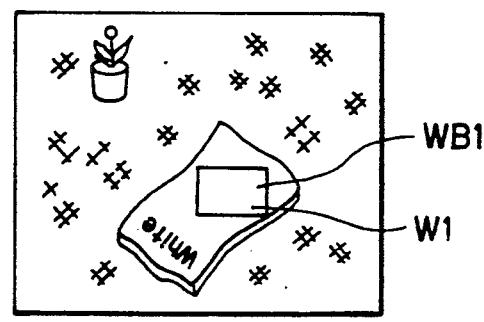

One-push auto-white-balance displays a white-balance detection area WB1, as shown in FIG. 13A. The position and dimensions of the white-balance-detection area WB1 can be varied as desired, as represented by the four arrows in FIG. 13A. As shown in FIG. 13B, when the white-balance-detection area WB1 is located on the white part W1 of the object and a one-push auto-white-balance setting button is pressed, white-balance control is carried out on the basis of a signal from a white-balance-detection area WB1. Because the position and dimensions of the white-balance-detection area WB1 can be changed as desired, white-balance control can be effected using a white portion of any object, such as a white part of clothing or the like. The white-balance control using a white portion present in the scene provides more precise white-balance adjustment than providing white-balance control by regarding the integrated value of the entire picture to be white.

White-balance control may also be carried out by setting a plurality of white-balance-detection areas and selecting one of them as approximately the black-body radiation curve. In FIG. 5A, the luminance signal Y from Y separator circuit 32 is supplied to integrator circuit 62A via gate circuit 61A. Similarly, the chrominance signals $C_R$ and $C_B$ from C separator circuit 33 are supplied to integrator circuits 62B and 62C via gate circuits 61B and 61C, respectively. Outputs of integrator circuits 62A and 62C are supplied as AWB detection signals to system controller 12 via serial output port 29.

The gate circuits 61A to 61C are controlled by respective gate signals for defining the white-balance-detection area from AWB detection area setting circuit 26. The gate signals control opening and closing of gate circuits 61A to 61C to determine the white-balance-detection area. In the case of auto-white-balance, the white balance detection area is set quite wide, whereas in the case of one-push auto-white-balance the white balance detection area can be varied according to the white part of the object.

System controller 12 is provide with the integrated values of the luminance signal Y and the chrominance signals $C_R$ and $C_B$ and white balance control is carried out on the basis of those values as follows, in which integrated values of the luminance signal Y and the chrominance signals $C_R$ and $C_B$ are referred to using the notation IN(Y), IN($C_R$) and IN($C_B$), respectively.

By subtracting integrated values IN($C_R$) and IN($C_B$) of the chrominance signals $C_R$ and $C_B$ from the integrated value IN(Y) of the luminance signal Y, the integrated value IN(G) of the green (G) color signal is obtained as follows:

$$IN(Y) - IN(C_R) - IN(C_B) = IN(3G + 2R + 2B) - IN(2R - G) - IN(2B - G)$$
$$= IN(5G)$$

By combining the integrated value IN(G) of the green (G) color signal obtained in the foregoing process and the integrated value IN($C_R$), the integrated value IN(R) of the red (R) color signal is obtained as follows:

$$IN(C_R) + IN(G) = IN(2R - G) + IN(G)$$
$$= IN(2R)$$

By combining the integrated value IN(G) of the green (G) color signal obtained in the foregoing process and the integrated value IN($C_B$), the integrated value IN(B) of the blue (B) color signal is obtained as follows:

$$IN(C_B) + IN(G) = IN(2B - G) + IN(G)$$
$$= IN(2B)$$

The gains of the respective three-component color signals R, G, and B are determined to establish a predetermined ratio of the integrated value levels of the three-component color signals R, G, and B obtained in foregoing processes. An example of such predetermined ratio for R:G:B is 2:5:2.

As described above, according to an embodiment of the present invention the digital luminance signal Y is formed from the analog luminance signal from CCD imaging device 2 in Y separator circuit 32 of FIG. 5A. Furthermore, the sampling frequency is also converted in Y separator circuit 32. More specifically, the sampling frequency of the digital luminance signal is (8/3) fsc for a CCD imaging device 2 having 510 pixels per line and 4 fsc for a CCD imaging device 2 having 760 pixels per line. In optical detector 11 of FIG. 1, signal processing is carried out at sampling frequency 2 fsc. Therefore, conversion from sampling frequency (8/3) fsc into sampling frequency 2 fsc or conversion from sampling frequency 4 fsc into sampling frequency 2 fsc is carried out in Y separator 32.

Unfortunately, such conversion of the sampling frequency involves the possibility of aliasing. More specifically, in the case where a CCD imaging device 2 having 760 pixels per line is used, the sampling frequency is 4 fsc, and the imaging signal therefore includes luminance signal components up to the frequency 2 fsc. If such signal is re-sampled at a sampling frequency 2 fsc, aliasing occurs about frequency 1 fsc, that is, about the color subcarrier frequency. Moreover, if the sampling frequency is converted from 4 fsc into 2 fsc, a high-range component at frequency 2 fsc is folded back into a DC components, which may cause a large error in the evaluated value.

Therefore, in order to perform conversion of the sampling frequency in the Y separator circuit 32, a high-range component that is folded back into a lower range must be suppressed.

Figure 15:
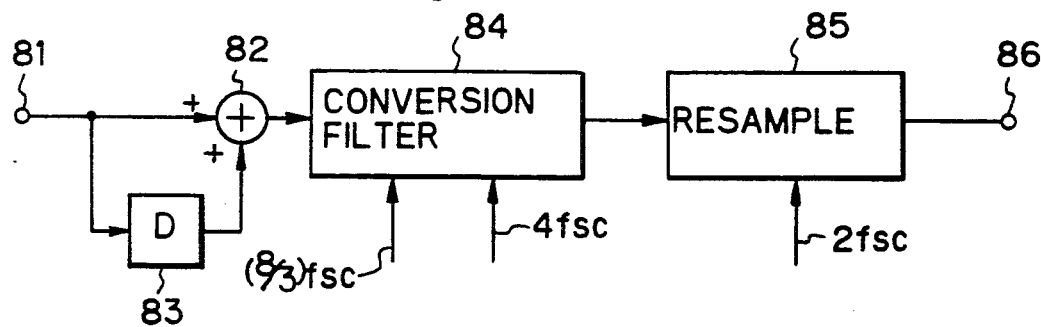
FIG. 15 is a schematic in block diagram form of a Y separator circuit for use with a CCD imaging device having 510 pixels per line.
Figure 16:
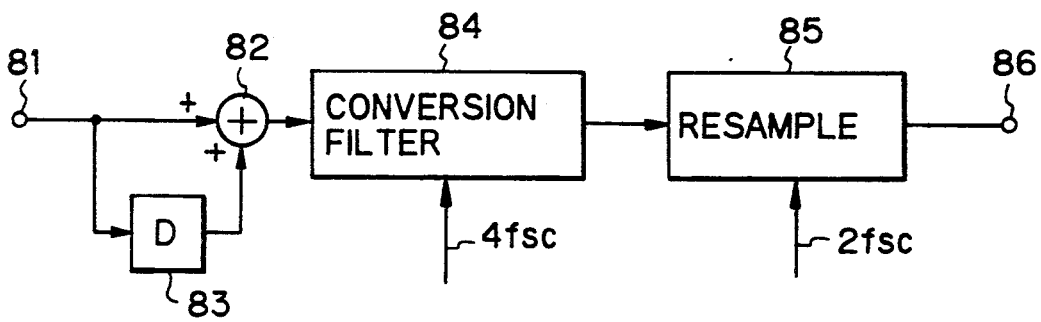
FIG. 16 is a schematic in block diagram form of a Y separator circuit for use with a CCD imaging device having 760 pixels per line.

FIGS. 15 and 16 show embodiments of Y separator circuit 32, in which FIG. 15 relates to an embodiment using a CCD imaging device 2 having 510 pixels per line, whereas FIG. 16 relates to an embodiment using a CCD imaging device 2 having 760 pixels per line.

In FIG. 15, the digital imaging signal is fed in at an input terminal 81 and supplied directly to an adder 82. The signal at input terminal 81 is also fed through a delay circuit 83 to adder 82. Thus, signals that differ by one sample are added in adder 82. As a result, the digital luminance signal Y is formed as described above.

The digital luminance signal Y from adder 82 is supplied to a conversion filter 84. When a CCD imaging device 2 having 510 pixels per line is used, a clock signal of frequency (8/3) fsc and a clock signal of frequency 4 fsc are both supplied to conversion filter 84. Conversion filter 84 converts the sampling frequency from (8/3) fsc to 4 fsc, and removes frequency components around the frequency (4/3) fsc.

The output of conversion filter 84 is supplied to a re-sampling circuit 85 that is also provided with a clock signal of frequency 2 fsc. The digital luminance signal of frequency 4 fsc output from conversion filter 84 is re-sampled with the clock of frequency 2 fsc in the re-sampling circuit 85. The output of the re-sampling circuit 85 is fed out at an output terminal 86.

When a CCD imaging device 2 having 760 pixels per line is used, only the clock signal of frequency 4 fsc is supplied to conversion filter 84, as shown in FIG. 16A, frequency components around the frequency 2 fsc are removed by conversion filter 84. The digital luminance signal of frequency 4 fsc output from conversion filter 84 is re-sampled with the clock of frequency 2 fsc in the re-sampling circuit 85.

Figure 17:
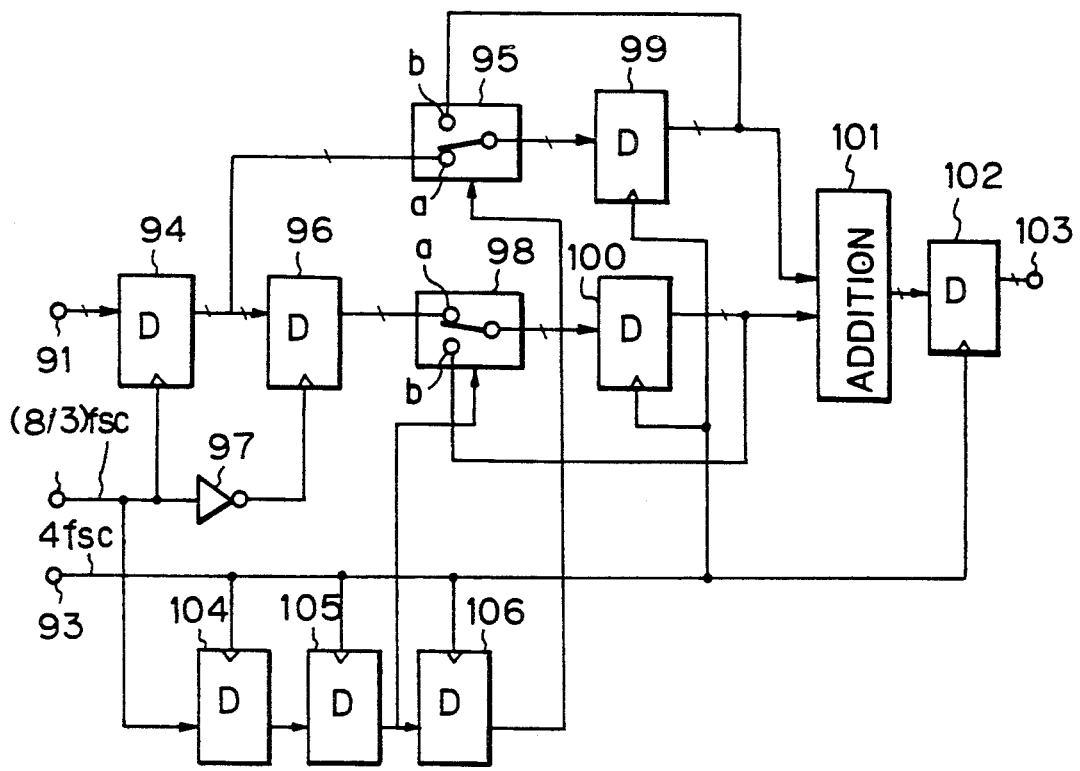
FIG. 17 is a schematic in block diagram form of a Y frequency conversion filter for use with a CCD imaging device having 510 pixels per line.
Figure 18:
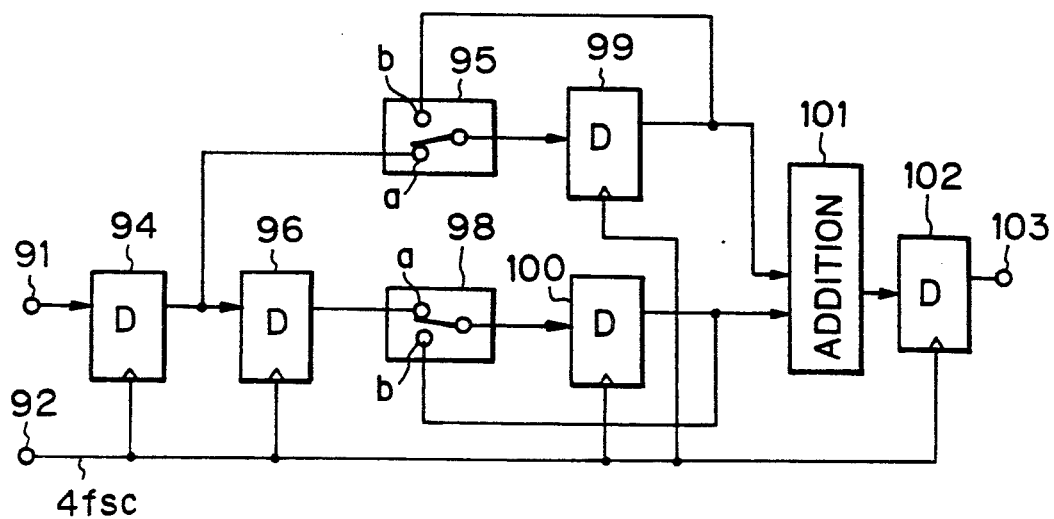
FIG. 18 is a schematic in block diagram form of a frequency conversion filter for use with a CCD imaging device having 760 pixels per line.

The arrangement of a conversion filter 84 for use with a CCD imaging device having 510 pixels per line is shown in FIG. 17 and a conversion filter 84 for use with a CCD imaging device having 760 pixels per line is shown in FIG. 18. When a CCD imaging device 2 having 510 pixels per line is used, the conversion filter 84 converts the sampling frequency from (8/3) fsc into 4 fsc and removes frequency components around (4/3) fsc. When a CCD imaging device 2 having 760 pixels per line is used, conversion filter 84 removes frequency components around frequency 2 fsc.

As shown in FIGS. 17 and 18, input data having different phases are formed by a flip-flop 96, and they are taken in flip-flops 99 and 100 via switch circuits 95 and 98, respectively. An output of flip-flop 99 and an output of the flip-flop 100 are added. Under control of switch circuits 95 and 98, input data and an input data signal delayed by flip-flop 96 by a predetermined amount as well as data heretofore stored in flip-flops 99 and 100 are selectively taken in flip-flops 99 and 100, respectively. As a result, the aforementioned digital signals $D_1, D_2, D_3, D_4, \ldots$ are obtained.

In the case that the sampling frequency is 4 fsc, the switch circuits 95 and 98 are fixed in one way. Accordingly, data through a filter having the following characteristic are obtained:

$$H(Z) = (1 + Z^{-1})/2$$

In FIG. 17, the digital luminance signal from CCD imaging device 2 is supplied to input terminal 91, and the conversion filter 84 of FIG. 17 sequentially produces output data from the digital luminance signals.

Such output data is equivalent to the result obtained by over-sampling a digital signal of (8/3) fsc at frequency 8 fsc, then extracting the over-sampled digital signal through a filter having the following characteristics:

$$H(Z)=(HZ^{-1}+Z^{-2})(HZ^{-1})/6$$

$$H(Z)=(1+2Z^{-1}+2Z^{-2}+Z^{-3})/6 \quad (1)$$

and re-sampling it at frequency 4 fsc.

More specifically, this is seen from the following wherein if it is assumed that digital signals $A_1$, $A_2$, $A_3$, ... of sampling frequency (8/3) fsc, as shown in FIG. 19A, are entered and that they are over-sampled at frequency 8 fsc, digital signals $A_1$, $a_1$, $a_2$, $A_2$, $a_3$, $a_4$, $A_3$, $a_5$, $a_6$, ... are obtained as shown in FIG. 19B. Among these signals, data $a_1$, $a_2$, $a_3$, $a_4$, $a_5$, $a_6$, ... are 0.

When the digital signals over-sampled at 8 fsc shown in FIG. 19B are output through the filter having the transfer function shown in equation (1), digital data $D_1$, $d_1$, $D_2$, $d_2$, $D_3$, $d_3$, ... are obtained as follows:

$$D_1 = (A_1 + 2a_1 + 2a_2 + A_2)/6$$
$$d_1 = (a_1 + 2a_2 + 2A_2 + a_3)/6$$
$$D_2 = (a_2 + 2A_2 + 2a_3 + a_4)/6$$
$$d_2 = (A_2 + 2a_3 + 2a_4 + A_3)/6$$
$$D_3 = (a_3 + 2a_4 + 2A_3 + a_5)/6$$
$$d_3 = (a_4 + 2A_3 + 2a_5 + a_6)/6$$
$$D_4 = (A_3 + 2a_5 + 2a_6 + A_4)/6$$

In this example, 1/6, which determines the overall gain, is omitted for clarity. Since data $a_1$, $a_2$, $a_3$, $a_4$, $a_5$, $a_6$, ... are 0:

$$D_1 = A_1 + A_2$$
$$d_1 = 2A_2$$
$$D_2 = 2A_2$$
$$d_2 = A_2 + A_3$$
$$D_3 = 2A_3$$
$$d_3 = 2A_3$$
$$D_4 = A_3 + A_4$$

When these digital signals are re-sampled at sampling frequency 4 fsc, digital signals $D_1$, $D_2$, $D_3$, $D_4$, ... shown in FIG. 19C are obtained as follows:

$$D_1 = A_1 + A_2$$
$$D_2 = 2A_2$$
$$D_3 = 2A_3$$
$$D_4 = A_3 + A_4$$
$$D_5 = 2A_4$$
$$D_6 = 2A_5$$

Referring to FIG. 17, a digital luminance signal of sampling frequency (8/3) fsc is supplied at an input terminal 91, and a clock signal is supplied at a first clock input terminal 92. Another clock signal of frequency 4 fsc is supplied at a second clock input terminal 93.

The digital luminance signal at input terminal 91 is fed to a data input terminal of a D flip-flop 94. The output of D flip-flop 94 is supplied to a fixed terminal a of a switch circuit 95 and to a data input terminal of another D flip-flop 96. A clock signal of frequency (8/3) fsc from input terminal 92 is supplied to a clock input terminal of D flip-flop 94, and D flip-flop 96 is supplied with a clock signal of frequency (8/3) fsc through an inverter 97. The output of D flip-flop 96 is supplied to a fixed input terminal of a second switch circuit 98. The output of switch circuit 95 is supplied to a data input terminal of another D flip-flop 99, whose output is supplied to one input terminal of an adder 101 and also to a fixed input terminal b of switch circuit 95.

The output of switch circuit 98 is supplied to a data input terminal of another D flip-flop 100 whose output is supplied to both the other input terminal of adder 101 and to input terminal b of switch circuit 98. Clock input terminals of D flip-flops 99 and 100 are supplied with a clock signal at frequency 4 fsc from clock input terminal 93.

The output of adder 101 is supplied to a data input terminal of a final D flip-flop 102. The clock input terminal of D flip-flop 102 is supplied with a clock signal at frequency 4 fsc from the clock input terminal 93. The output of D flip-flop 102 is fed out at an output terminal 103.

The clock signal at clock input terminal 92 is supplied to a data input terminal of another D flip-flop 104, whose output is supplied to a data input terminal of a second D flip-flop 105, whose output in turn is supplied to a data input terminal of a third D flip-flop 106. Clock input terminals of the D flip-flops 104, 105, 106 are supplied with a clock signal at frequency 4 fsc from clock input terminal 93. The output of D flip-flop 105 is supplied as a switch control signal to switch circuit 98. The output of D flip-flop 106 is supplied as a switch control signal to switch circuit 95.

The digital signals $A_1$, $A_2$, $A_3$, ... fed in at input terminal 91 in FIG. 17 are shown in FIG. 20C and are taken in D flip-flop 94 at the rising edge of the clock pulses at frequency (8/3) fsc, as shown in FIG. 20A. Digital signals $A_1$, $A_2$, $A_3$, ... are output from D flip-flop 94 with the timing shown in FIG. 20D and are supplied to input terminal a of switch circuit 95.

The clock signal at frequency (8/3) fsc supplied to clock input terminal 92 has the duty ratio of 33%, as shown in FIG. 20A. FIG. 20B shows this clock signal after having been inverted by inverter 97. At the rising edge of the pulses in inverted clock signal of frequency (8/3) fsc, output data from D flip-flop 94 in FIG. 20D are taken in D flip-flop 96. D flip-flop 96 outputs digital signals $A_1$, $A_2$, $A_3$, ... with the timing shown in FIG. 20E, and the output of D flip-flop 96 is supplied to input terminal a of switch circuit 98.

As shown in FIGS. 20D and 20E, the timing of the digital signal output from D flip-flop 96 is behind the timing of the digital signal output from D flip flop 94 by ⅓ of a clock period at (8/3) fsc.

The clock signal of frequency (8/3) fsc from clock input terminal 92 is taken in D flip-flop 104 at the rising edge of the clock pulse at frequency 4 fsc from clock input terminal 93, as shown in FIG. 20F. D flip-flop 104 outputs the signal shown in FIG. 20G which is taken in D flip-flop 105 at the rising edge of the clock pulses at frequency 4 fsc from the clock input terminal 93. D flip-flop 105 outputs the signal shown in FIG. 20H that is taken in D flip-flop 106 at the rising edge of the clock pulse of frequency 4 fsc from the clock input terminal 93. The D flip-flop outputs the signal shown in FIG. 20I.

As shown in FIG. 20K, switch circuit 98 is switched by the output of D flip-flop 105. More specifically, switch circuit 98 is switched to the a terminal when the output of D flip-flop 105 is low and it is switched to be b terminal when the output of D flip-flop 105 is high level.

As shown in FIG. 20J, switch circuit 95 is switched by the output of D flip-flop 106, which is shown in FIG. 20I. When the output of D flip-flop 106 is low, switch circuit 95 is switched to the a terminal, and when the output of the D flip-flop 106 is high, switch circuit 95 is switched to the b terminal.

If data $A_1$ is supplied to input terminal 91 at time $T_0$, as shown in FIG. 20C, D flip-flop 94 will output the data $A_1$ at time $T_1$ which is behind by 1 clock period at frequency (8/3) fsc, as shown in FIG. 20D. The data $A_1$ is taken into D flip-flop 96 at time $T_2$ which is further behind by (⅛) of a clock period at frequency (8/3) fsc, as shown in FIG. 20E.

At time $t_1$ when the clock of frequency 4 fsc shown in FIG. 20F rises, the output of switch circuit 95 is taken into D flip-flop 99, and the output of switch circuit 98 is taken into D flip-flop 100. At time $t_1$, both switch circuits 95 and 98 have been switched to terminal a, as shown in FIGS. 20J and 20K. Therefore, as shown in FIG. 20L, data $A_1$ then having been output from D flip-flop 94 is taken into D flip-flop 99. Further, as shown in FIG. 20M, data $A_1$ then having been output from D flip-flop 96 is taken into D flip-flop 100.

As from time $T_3$, when the edge of a clock pulse of frequency (8/3) fsc rises, data $A_2$ is output from D flip-flop 94 as shown in FIG. 20D. From time $T_4$ which is behind by (⅛) of a clock period therefrom at frequency (8/3) fsc, data $A_2$ is output from D flip-flop 96, as shown in FIG. 20E.

At time $T_2$, when the edge of clock pulse of frequency 4 fsc shown in FIG. 20F rises, the output of switch circuit 95 is taken into D flip-flop 99, and the output of switch circuit 98 is taken into D flip-flop 100. At time $t_2$, as shown in FIGS. 20J and 20K, switch circuit 95 has been switched to terminal a, and switch circuit 98 has been switched to terminal b. Therefore, as shown in FIG. 20L, data $A_2$ then having been output from D flip-flop 94 is taken into D flip-flop 99, and data $A_1$ having been previously stored in D flip-flop 100 is taken back again into D flip-flop 100, as shown in FIG. 20M.

Outputs of D flip-flops 99 and 100 are added in adder 101 and because D flip-flops 99 and 100 have output data $A_2$ and $A_1$, respectively, data $(A_1+A_2)$ is obtained in adder 101, as shown in FIG. 20N.

From time $T_5$, when the edge of a clock pulse of frequency (8/3) fsc rises, D flip-flop 94 outputs data $A_3$, as shown in FIG. 20D. At time $t_3$, when the edge of a clock pulse of frequency 4 fsc shown in FIG. 20F rises, the output of switch circuit 95 is taken into D flip-flop 99, and the output of switch circuit 98 is taken into D flip-flop 100. At time $t_3$, as shown in FIGS. 20J and 20K, switch 95 has been switched to terminal b, and switch circuit 98 has been switched to terminal a. Therefore, as shown in FIG. 20L, data $A_2$ having been stored in D flip-flop 99 is taken again back into D flip-flop 99. Further, as shown in FIG. 20M, data $A_2$ then having been output from switch circuit 98 is taken into D flip-flop 100. Because D flip-flops 99 and 100 both output data $A_2$, $2A_2$ is obtained in the adder 101 as shown in FIG. 20M.

At time $T_6$, when the edge of an inverted clock pulse of frequency (8/3) fsc rises, data $A_3$ is output from D flip-flop 94, as shown in FIG. 20E. At time $t_4$, when the edge of a clock pulse of frequency 4 fsc shown in FIG. 20F rises, the output of switch circuit 95 is taken into D flip-flop 99, and the output of switch circuit 98 is taken into D flip-flop 100. At time $t_4$, as shown in FIGS. 20J and 20K, both switch circuits 95 and 98 have been switched to terminal a. Therefore, as shown in FIG. 20L, data $A_3$ then having been output from switch circuit 95 is taken into D flip-flop 99. Further, as shown in FIG. 20M, data $A_3$ then having been output from switch circuit 98 is taken into D flip-flop 100. Because both D flip-flops 99 and 100 output data $A_3$, $2A_3$ is obtained in adder 101, as shown in FIG. 20N.

From time $T_7$, when the edge of a clock pulse of frequency (8/3) fsc rises, data $A_4$ is output from D flip-flop 94 as shown in FIG. 20D. From time $T_8$, when the edge of an inverted clock pulse of (8/3) fsc rises, data $A_4$ is output from D flip-flop 94, as shown in FIG. 20E. At time $t_5$, when the edge of a clock pulse of frequency 4 fsc shown in FIG. 20F rises, the output of switch circuit 95 is taken into D flip-flop 99, and the output of switch circuit 98 is taken into D flip-flop 100. At time $t_5$, as shown in FIGS. 20J and 20K, switch circuits 95 and 98 have been switched to terminal a and terminal b, respectively. Therefore, as shown in FIG. 20L, data $A_4$ then having been output from D flip-flop 94 is taken in D flip-flop 99. Further, as shown in FIG. 20M, data $A_3$ having been stored in D flip-flop 100 is taken back again into D flip-flop 100.

Outputs of D flip-flops 99 and 100 are added in adder 101. Because D flip-flops 99 and 100 have output data $A_4$ and $A_3$, respectively, data $(A_3+A_4)$ is obtained in adder 101, as shown in FIG. 20N. The foregoing operations are continuously repeated thereafter.

As shown in FIG. 20N, data $(A_1+A_2)$, $2A_2$, $2A_3$, $(A_3+A_4)$ . . . are obtained successively from adder 101, and the output of adder 101 is extracted through D flip-flop 102, as shown in FIG. 20O.

A slightly different circuit arrangement for the conversion filter is provided for use with a CCD imaging device having 760 pixels per line. FIG. 18 shows a digital signal of sampling frequency 4 fsc supplied to input terminal 91. The clock signal input terminal 92 is provided with a clock signal of frequency 4 fsc and switch circuits 95 and 98 are fixed at the terminal a side. Additionally, the clock input terminal of D flip-flop 96 is supplied with a signal of frequency 4 fsc directly from clock input terminal 92 and no inverter is required. Flip-flops 99, 100, 102 and adder 101 are connected the same as the foregoing arrangement provided for the CCD imaging device having 510 pixels per line.

In this case, digital luminance signals $B_1$, $B_2$, $B_3$, . . . from the CCD imaging device 2 of FIG. 1 are supplied to input terminal 91. In the conversion filter 84 shown in FIG. 18, data $(B_1+B_2)$, $(B_2+B_3)$, $(B_3+B_4)$, . . . are formed successively from the digital signals $B_1$, $B_2$, $B_3$, . . . The data output corresponds to the digital signal of 4 fsc extracted through a filter whose transfer function H(Z) is as follows:

$$H(Z)=(1+Z^{-1})/2$$

In FIG. 18, the digital luminance signals $B_1$, $B_2$, $B_3$, . . . as shown in FIG. 21B are supplied to input terminal 91, and a clock signal of 4 fsc shown in FIG. 21A is fed in at terminal 92. The digital luminance signals from the input terminal 91 are taken into D flip-flop 94 at the rising edge of a clock pulse of frequency 4 fsc, shown in FIG. 21A, and D flip-flop 94 outputs the digital signal $B_1$, $B_2$, $B_3$, with the timing shown in FIG. 21C.

The output of D flip-flop 94 is taken into D flip-flop 96 at the rising edge of the clock pulse of frequency 4 fsc. D flip-flop 96 outputs the digital signals $B_1$, $B_2$, $B_3$, . . . with the timing shown in FIG. 21D.

As shown in FIGS. 21C and 21D, the output of D flip-flop 94 is delayed by one clock period with respect to the output of D flip-flop 96. Because switch circuits 95 and 98 have been switched to terminal a, as shown in FIGS. 21E and 21F, outputs of D flip-flops 94 and 96 are taken into D flip-flops 99 and 100, respectively, at the rising edge of the clock of pulse frequency 4 fsc shown in FIG. 21A.

D flip-flop 99 and 100 output the digital signals $B_1$, $B_2$, $B_3$, ... with the timings shown in FIGS. 21G and 21H, and the outputs are added in adder 101. As a result, as shown in FIGS. 21I, data $(B_1+B_2)$, $(B_2+B_3)$, $(B_3+B_4)$, ... are formed successively, and extracted from output terminal 103 through D flip-flop 102, as shown in FIGS. 21J.

Figure 22:
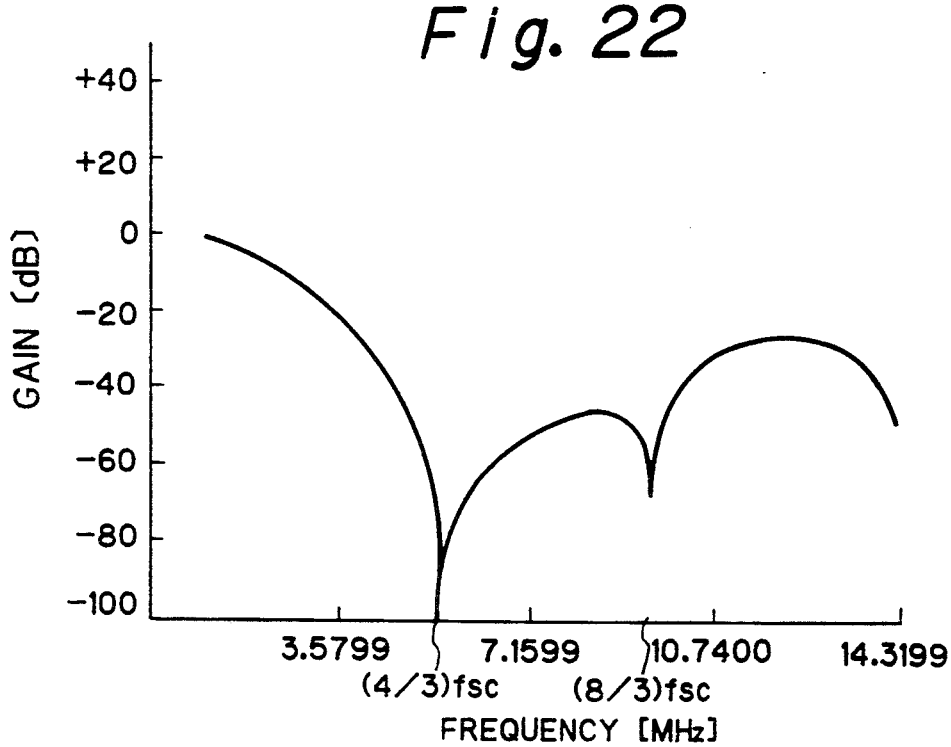
FIG. 22 is a frequency characteristic diagram useful in explaining the Y separator circuit used with the CCD imaging device having 510 pixels per line.

FIG. 22 shows a gain versus frequency characteristic of Y separator circuit 32 employing a conversion filter such as shown in FIG. 17 receiving a signal from a CCD imaging device having 510 pixels per line. In this case, conversion filter 84 has a characteristic transfer function H(Z) expressed below:

$$H(Z)=(1+2Z^{-1}+2Z^{-2}+Z^{-3})/6$$

with respect to a signal obtained by over-sampling the digital signal of sampling frequency (8/3) fsc at a frequency 8 fsc as described hereinabove. Therefore, the entire Y separator circuit 32 has the characteristic shown in FIG. 22, wherein it is evident that a component of (4/3) fsc that is folded back into a low range component has been removed in the Y separator circuit 32.

Figure 23:
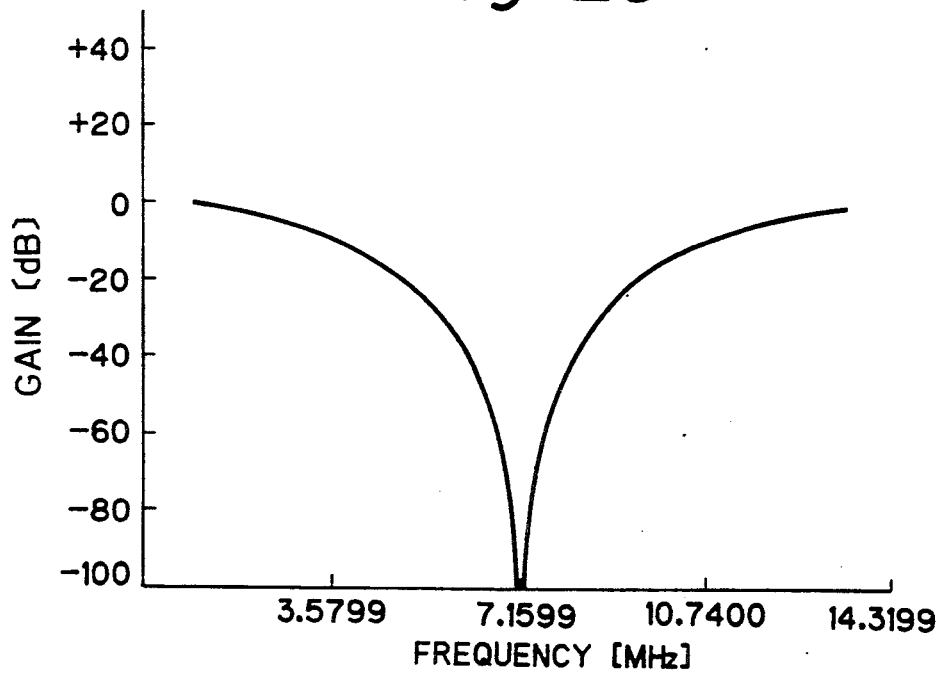
FIG. 23 is a frequency characteristic diagram useful in explaining the Y separator circuit used with the CCD imaging device having 760 pixels per line.

FIG. 23 shows a characteristic of the Y separator circuit 32 employing a conversion filter such as shown in FIG. 18 receiving a signal from a CCD imaging device having 510 pixels per line. In this case, conversion filter 84 has the characteristic transfer function shown below:

$$H(Z)=(1+Z^{-1})/2$$

with respect to the digital signal of sampling frequency 4 fsc as described hereinabove. Therefore, the entire Y separator circuit 32 has the characteristic shown in FIG. 23. It is evident from the characteristic curve shown in FIG. 23 that a component of 2 fsc folded back into a low range component has been removed.

According to the present invention, when a CCD imaging device having 510 pixels per line is used, input data having different phases are formed using flip-flop 96, and switch circuits 95 and 98 are controlled so that the input data initially stored in flip-flops 99 and 100 is subsequently changed in phase and again stored therein. Subsequently, outputs of flip-flops 99 and 100 are combined in adder 101, so that an output is obtained that is equivalent to a result obtained by over-sampling the digital signal of sampling frequency (8/3) fsc at frequency 8 fsc that is a common multiple of sampling frequency 4 fsc and by passing it through a filter having the transfer function expressed by:

$$H(Z)=(1+2Z^{-1}+2Z^{-2}+Z^{-3})/6$$

It is noted that the system is configured to effectively perform over-sampling at frequency 8 fsc and obtain data upon being re-sampled at frequency 4 fsc, however, not part thereof is required to be operated at frequency 8 fsc, which eliminates the requirement for high-speed devices.

Additionally, if switch circuits 95 and 98 are fixed, the system can obtain data resulting from passing an output of a CCD imaging device having 760 pixels per line through a filter having the characteristic indicated below:

$$H(Z)=(1+Z^{-1})/2$$

Therefore, common hardware can be used for CCD imaging devices that have different numbers of pixels per line.

Having described a preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

What is claimed is:

1. A sampling frequency conversion filter circuit for converting an input digital signal of a first sampling frequency into a digital signal of a second sampling frequency, comprising:

a delay circuit for delaying the input digital signal of said first sampling frequency by a predetermined time;

a first multivibrator circuit for receiving the input digital signal of said first sampling frequency in synchronism with clock pulses at said second sampling frequency;

a second multivibrator circuit for receiving the digital signal of said first sampling frequency delayed by the predetermined time output from said delay circuit in synchronism with clock pulses of said second sampling frequency;

an adder circuit for adding an output of said first multivibrator circuit and an output of said second multivibrator circuit to produce a converted filter output signal; and control circuit means for controlling respective inputs of said first and second multivibrator circuits to obtain from said adder circuit an output equivalent to over-sampling the digital signal of said first sampling frequency at a frequency that is a common multiple of said first sampling frequency and said second sampling frequency.

2. A sampling frequency conversion filter circuit according to claim 1, wherein the digital signal of said first sampling frequency is obtained by sampling an output of an imaging device.

3. A sampling frequency conversion filter circuit according to claim 2, wherein said first sampling frequency is based on transfer clocks of said imaging device.

4. A sampling frequency conversion filter circuit according to claim 3, wherein the digital signal of said second sampling frequency is supplied to a signal processing circuit for executing an auto focus control.

5. A sampling frequency conversion filter circuit according to claim 4, wherein said second sampling frequency is set to an integral multiple of an operating frequency of said signal processing circuit and the digital signal of said second sampling frequency is resampled at the operating frequency of said signal processing circuit and supplied to said signal processing circuit for executing said auto focus control.

6. A sampling frequency conversion filter circuit according to claim 1, wherein said control circuit means includes first and second switch means connected respectively to the inputs of said first and second multivibrator circuits, said first switch means being connected to switch between the input digital signal of said first sampling frequency and the output of said first multivibrator circuit and said second switch means being connected to switch between the delayed input digital signal and the output of said second multivibrator circuit and a circuit in synchronism with clock pulses at said second sampling frequency for controlling switching action of said first and second switch means.

7. A sampling frequency conversion filter circuit according to claim 6, wherein said circuit for controlling comprises three flip-flop circuits connected in cascade, the first flip-flop receiving as a data signal clock pulses at said first sampling frequency and each flip-flop receiving as a clock signal pulses at said second sampling frequency, the output of the second of said three cascaded flip-flops controlling and switching action of said second switch means and the output of the third of said three cascaded flip-flops controlling said first switch means.

8. A sampling conversion filter circuit according to claim 1 further comprising a third multivibrator circuit connected to the output of said adder circuit and the clock pulses at said second sampling frequency for producing the converted filter output signal.

9. A sampling frequency conversion filter according to claim 1, wherein said first and second multivibrator circuits are comprised of D-type flip-flops.

10. A conversion filter for converting a digital data signal of a first sampling frequency from a video image sensor having a known number of pixels into a digital signal of a second sampling frequency, comprising:
   means for delaying a digital input data signal at said first sampling frequency by one period of said first sampling frequency and producing a delayed digital signal;
   a first flip-flop circuit receiving at a data input said digital input data signal and clock pulses at said second sampling frequency at a clock input;
   a second flip-flop circuit receiving at a data input said delayed digital signal and clock pulses at said second sampling frequency at a clock input;
   a signal adder for adding respective outputs of said first and second flip-flop circuits; and
   control means for controlling the timing of respective inputs to said first and second flip-flop circuits in synchronism with pulses at said second sampling frequency, so that the output of said signal adder is equivalent to oversampling the input digital signal at said first sampling at a frequency that is a common multiple of said first sampling frequency that said second sampling frequency.

11. A conversion filter according to claim 10, wherein said control means comprises a first switching means receiving the digital data input signal at one input and the output of said first flip-flop circuit at a second input and receiving a first switching signal at said second sampling frequency, the output the first switching means being connected to the data input of said switching means being connected to the data input of said first flip-flop circuit, and a second switching means receiving the delayed digital signal at one input and the output of said second flip-flop circuit at a second input and receiving a second switching signal at said second sampling frequency, the output of the switching means being connected to the data input of said first flip-flop circuit, and a second switching means receiving the delayed digital signal at one input and the output of said second flip-flop circuit at a second input and receiving a second switching signal at said second sampling frequency, the output of the second switching means being connected to the data input of said second flip-flop circuit.

12. A conversion filter according to claim 11, wherein said control means further comprises a plurality of flip-flop circuits connected in cascade, the first of said plurality receiving at a data input a signal at said first sampling frequency, and each of said plurality of flip-flop circuits receiving a clock input a signal at said second sampling frequency, whereby successive ones of said plurality of flip-flop circuits produce said second switching signal and said first switching signal respectively.

* * * * *